US012586289B1

(12) United States Patent
Valecha et al.

(10) Patent No.: US 12,586,289 B1
(45) Date of Patent: Mar. 24, 2026

(54) DELIVERY OF DIGITAL CONTENT IN VIRTUAL REALITY SESSION

(71) Applicant: International Business Machines Corporation, Armonk, NY (US)

(72) Inventors: Vinod Anandram Valecha, Pune (IN); Sarbajit Kumar Rakshit, Kolkata (IN); Sathya Santhar, Ramapuram (IN); Sridevi Kannan, Katupakkam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 19/008,987

(22) Filed: Jan. 3, 2025

(51) Int. Cl.
*G06F 3/01* (2006.01)
*G06T 15/04* (2011.01)

(52) U.S. Cl.
CPC .............. *G06T 15/04* (2013.01); *G06F 3/011* (2013.01); *G06F 3/017* (2013.01)

(58) Field of Classification Search
None
See application file for complete search history.

(56) References Cited

U.S. PATENT DOCUMENTS

| | | | | |
|---|---|---|---|---|
| 9,710,151 | B2 * | 7/2017 | Cardonha | ............. G06F 3/0488 |
| 10,776,447 | B2 * | 9/2020 | Capon | ................... G06F 40/143 |
| 11,829,524 | B2 | 11/2023 | Elhadad et al. | |
| 2012/0038542 | A1 * | 2/2012 | Miyashita | ............. G06F 3/0485 |
| | | | | 345/7 |

| | | | |
|---|---|---|---|
| 2017/0076498 | A1 | 3/2017 | Dakss et al. |
| 2017/0185596 | A1 | 6/2017 | Spirer |
| 2018/0158243 | A1 | 6/2018 | Gleason et al. |
| 2019/0238952 | A1 * | 8/2019 | Boskovich ....... H04N 21/23418 |
| 2022/0030325 | A1 * | 1/2022 | Boskovich ............. G06V 20/64 |
| 2022/0157026 | A1 | 5/2022 | Bennett et al. |

(Continued)

FOREIGN PATENT DOCUMENTS

| | | |
|---|---|---|
| KR | 2021-0131828 A | 11/2021 |
| WO | 2024/049579 A1 | 3/2024 |

OTHER PUBLICATIONS

Biener et al., "PoVRPoint: Authoring Presentations in Mobile Virtual Reality", arXiv:2201.06337v1 [cs. HC], Jan. 17, 2022, 11 pages.

(Continued)

*Primary Examiner* — Parul H Gupta
(74) *Attorney, Agent, or Firm* — CHIP LAW GROUP

(57) ABSTRACT

Delivery of digital content in virtual reality session includes receiving input data comprising digital content and configuration data. Rendering information associated with the digital content is determined based on the configuration data. A first set of instructions is generated for each user device of a first set of user devices. The first set of instructions is associated with the display of the digital content on at least one user device of the first set of user devices. A second set of instructions is generated for each user device of a second set of user devices. The second set of instructions is associated with the display of the digital content on at least one user device of the second set of user devices. Each instruction of the first set of instructions and each instruction of the second set of instructions is outputted for the display of the digital content.

20 Claims, 9 Drawing Sheets

(56)          References Cited

U.S. PATENT DOCUMENTS

2024/0104849  A1       3/2024  Nie et al.
2024/0273793  A1 *     8/2024  DeCharms ............ G06F 40/197

OTHER PUBLICATIONS

IBM, "IBM Cloud® compliance: ITAR", https://www.ibm.com/
cloud/compliance/itar, dated Mar. 12, 2025, 3 pages.
Authors et al.: IBM Scott, RK, IP.Com IPCOM000117365D, Ana-
log Interactive Television System with Two Service Levels, Feb. 1,
1996, 7 pages.
Authors  et  al.:  Disclosed  Without  Attribution,  IP.Com
IPCOM000256386D, System and Method for Cultural Adaption of
Educational Content in a Live Setting, Nov. 28, 2018, 6 pages.
Ryssdal et al., "Is this what the "metaverse" looks like?", Market-
place, Jun. 1, 2022, 10 pages.

* cited by examiner

Figure 8:
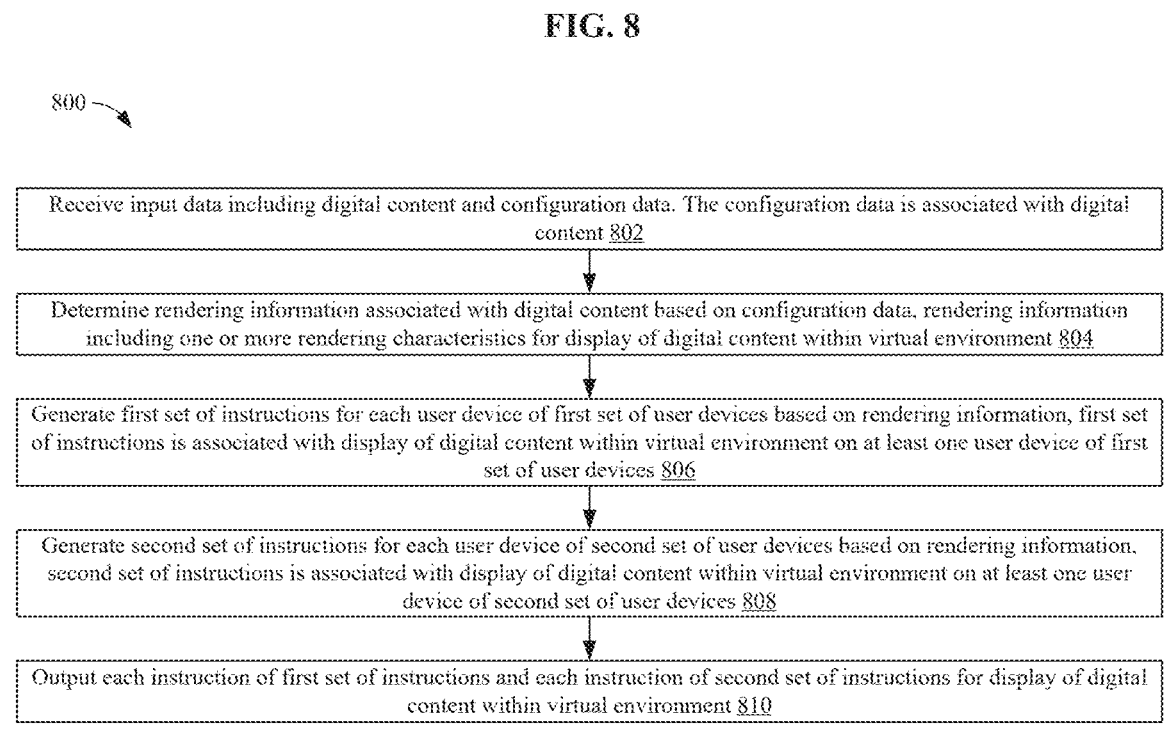

Receive input data including digital content and configuration data. The configuration data is associated with digital content 802

Determine rendering information associated with digital content based on configuration data, rendering information including one or more rendering characteristics for display of digital content within virtual environment 804

Generate first set of instructions for each user device of first set of user devices based on rendering information, first set of instructions is associated with display of digital content within virtual environment on at least one user device of first set of user devices 806

Generate second set of instructions for each user device of second set of user devices based on rendering information, second set of instructions is associated with display of digital content within virtual environment on at least one user device of second set of user devices 808

Output each instruction of first set of instructions and each instruction of second set of instructions for display of digital content within virtual environment 810

Figure 9:
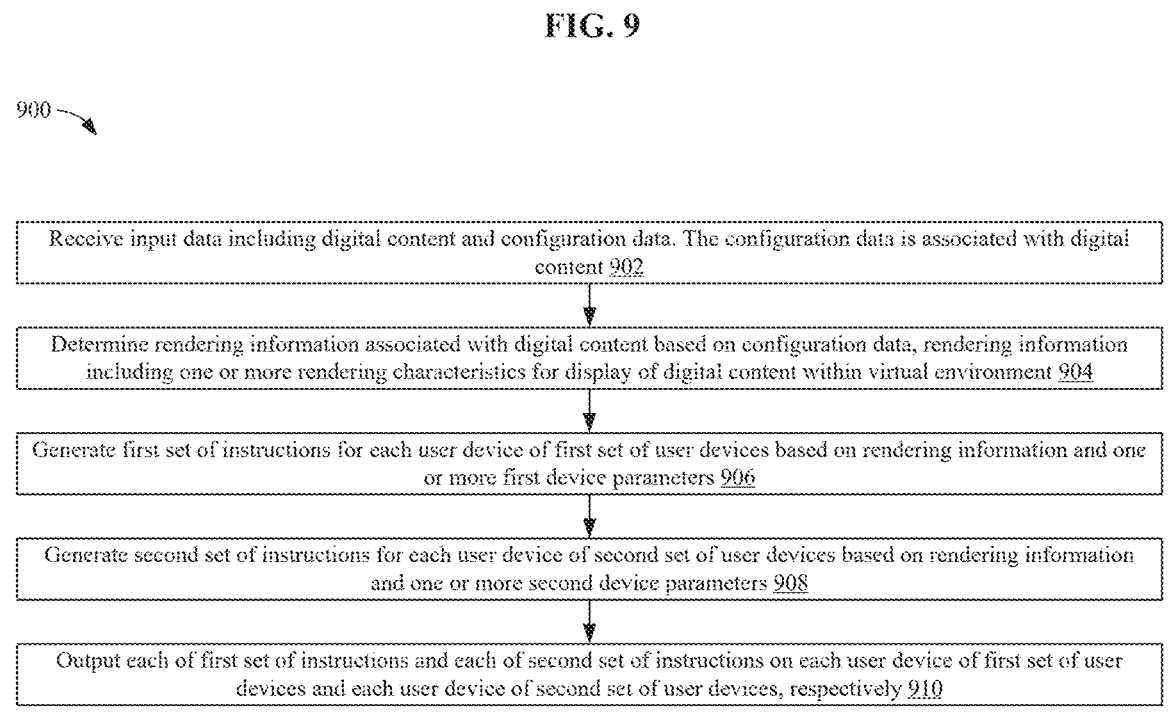

| Receive input data including digital content and configuration data. The configuration data is associated with digital content 902 |

⬇

| Determine rendering information associated with digital content based on configuration data, rendering information including one or more rendering characteristics for display of digital content within virtual environment 904 |

⬇

| Generate first set of instructions for each user device of first set of user devices based on rendering information and one or more first device parameters 906 |

⬇

| Generate second set of instructions for each user device of second set of user devices based on rendering information and one or more second device parameters 908 |

⬇

| Output each of first set of instructions and each of second set of instructions on each user device of first set of user devices and each user device of second set of user devices, respectively 910 |

DELIVERY OF DIGITAL CONTENT IN VIRTUAL REALITY SESSION

BACKGROUND

The disclosure relates to virtual reality (VR) technology and digital content delivery systems and more particularly, to delivery of digital content in virtual reality session.

Slide-based presentations in a VR environment revolutionize audience engagement by transforming traditional slides into immersive three-dimensional experiences. Leveraging VR technology, users navigate through slides with natural gestures, creating a seamless information architecture. Further, visual elements such as charts, graphs, and images are rendered in a spatial context, offering depth and realism that captivate viewers. This immersive experience allows the users (e.g., presenter and audience) to move around and explore content, fostering a sense of presence and interactivity that enhances understanding and retention of the users.

By facilitating enhanced narrative complexity and dynamic data visualization, VR-based presentations enable presenters to convey information in an engaging manner, fundamentally changing how presentations are delivered and experienced across various fields.

SUMMARY

According to an embodiment of the disclosure, a computer-implemented method for a delivery of digital content in a virtual reality session is described. The computer-implemented method includes receiving, by a computer, input data including digital content and configuration data. The configuration data is associated with the digital content. The computer-implemented method further includes determining, by the computer, rendering information associated with the digital content based on the configuration data. The rendering information includes one or more rendering characteristics for a display of the digital content within a virtual environment. The virtual environment is displayed on a first set of user devices and a second set of user devices. The computer-implemented method further includes generating, by the computer, a first set of instructions for each user device of the first set of user devices based on the rendering information. The first set of instructions is associated with the display of the digital content within the virtual environment on at least one user device of the first set of user devices. The computer-implemented method further includes generating, by the computer, a second set of instructions for each user device of the second set of user devices based on the rendering information. The second set of instructions is associated with the display of the digital content within the virtual environment on at least one user device of the second set of user devices. The computer-implemented method further outputting, by the computer, each instruction of the first set of instructions and each instruction of the second set of instructions for the display of the digital content within the virtual environment. The digital content is displayed on each user device of the first set of user devices and each user device of the second set of user devices.

According to one or more embodiments of the disclosure, a computer system for the delivery of digital content in the virtual reality session is disclosed. The computer system includes a processor set, one or more computer-readable storage media, and program instructions stored on the one or more computer-readable storage media. The program instructions are executable by the processor set to cause the processor set to receive input data including digital content and configuration data. The configuration data is associated with the digital content. The program instructions cause the processor set to determine rendering information associated with the digital content based on the configuration data. The rendering information includes one or more rendering characteristics for a display of the digital content within a virtual environment. The virtual environment is displayed on a first set of user devices and a second set of user devices. The program instructions cause the processor set to generate a first set of instructions for each user device of the first set of user devices based on the rendering information and one or more first device parameters. The program instructions cause the processor set to generate a second set of instructions for each user device of the second set of user devices based on the rendering information and one or more second device parameters. The program instructions cause the processor set to output each of the first set of instructions and each of the second set of instructions on each user device of the first set of user devices and each user device of the second set of user devices, respectively.

According to one or more embodiments of the disclosure, a computer program product the delivery of digital content in the virtual reality session is disclosed. The computer program product includes one or more computer-readable storage media and program instructions stored on the one or more computer-readable storage media to perform operations. The operations include receiving input data including digital content and configuration data. The configuration data is associated with the digital content. The operations further include determining rendering information associated with the digital content based on the configuration data. The rendering information includes one or more rendering characteristics for a display of the digital content within a virtual environment. The virtual environment is displayed on a first set of user devices and a second set of user devices. The operations further include generating a first set of instructions for each user device of the first set of user devices based on the rendering information. The first set of instructions is associated with the display of the digital content within the virtual environment on at least one user device of the first set of user devices. The operations further include generating a second set of instructions for each user device of the second set of user devices based on the rendering information. The second set of instructions is associated with the display of the digital content within the virtual environment on at least one user device of the second set of user devices. The operations further include outputting each instruction of the first set of instructions and the second set of instructions for the display of the digital content within the virtual environment. The digital content is displayed on each user device of the first set of user devices and each user device of the second set of user devices.

BRIEF DESCRIPTION OF THE DRAWINGS

The following description will provide details of preferred embodiments with reference to the following figures wherein:

FIG. 1 is a diagram that illustrates a computing environment for a delivery of digital content in a virtual reality session, in accordance with an embodiment of the disclosure;

FIG. 8 is a diagram that illustrates a flowchart of a first exemplary method for the delivery of the digital content in the virtual reality session, in accordance with an embodiment of the disclosure; and FIG. 9 is a diagram that illustrates a flowchart of a second exemplary method for the delivery of the digital content in the virtual reality session, in accordance with an embodiment of the disclosure.

DETAILED DESCRIPTION

Figure 2:
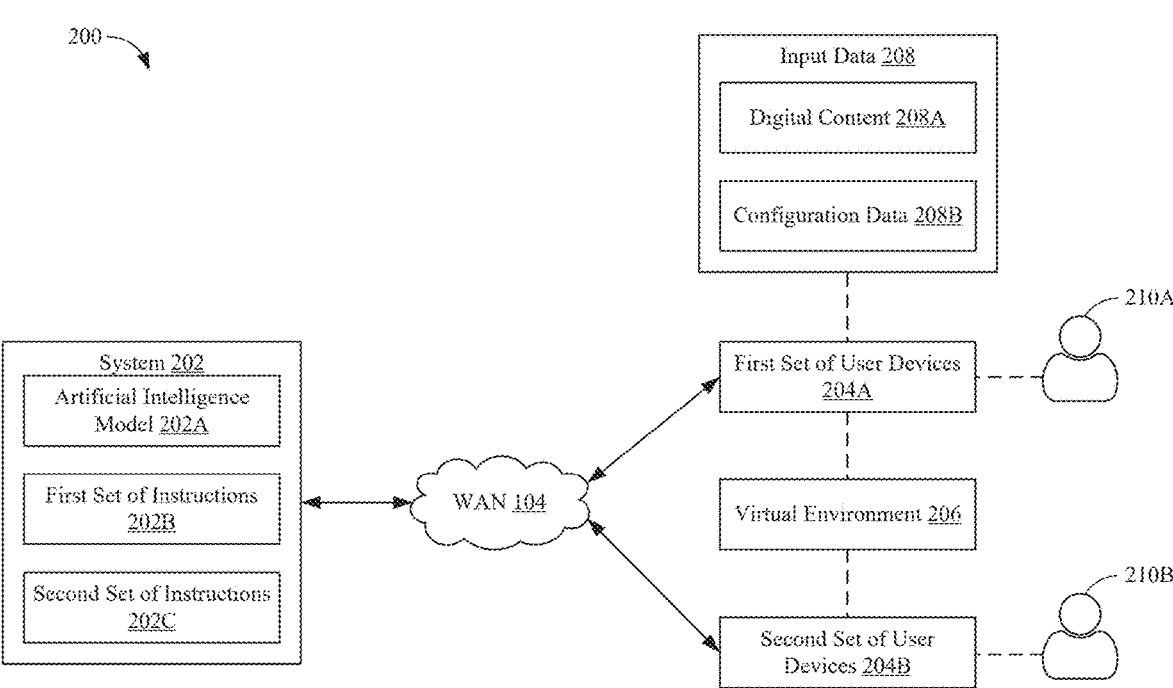
FIG. 2 is a diagram that illustrates an environment for the delivery of the digital content in the virtual reality session, in accordance with an embodiment of the disclosure.

In traditional PowerPoint presentations, presenters often rely on static slides displayed on screens, which can limit audience interaction and engagement. This format typically offers few dynamic interaction methods, making it challenging for the presenters to respond to participants' requirements and facilitate discussions. Consequently, this structure can hinder effective communication and fail to maintain participant interest.

In virtual reality (VR) educational and presentation sessions, presenters encounter several challenges that can hinder effective communication and engagement. One major issue is the limited interaction methods typically employed in VR environments. The presenters often rely on virtual display screens to show their slides, which can restrict their ability to engage participants dynamically. Additionally, the presenters may wish to display content contextually, showcasing specific information based on the current topic of discussion. This need for flexibility emphasizes the importance of having a system that can adapt to the flow of a presentation, allowing for a more interactive and immersive experience.

Additional challenge arises from the variety of digital content included in presentations, such as text, images, videos, and 3D models. The digital content may require different methods of display and interaction to maximize effectiveness. For example, slides with textual information are required to be displayed on a virtual screen for reading, while images may benefit from immersive 3D environments that allow participants to explore details of the images up close. Further, videos may be presented in a separate, interactive panel, enabling real-time discussions around the digital content. Additionally, 3D models may require manipulation within the virtual environment, allowing the participant and the presenters to rotate and examine them from different angles. Each type of digital content may necessitate different methods of display and interaction to maximize effectiveness. The same approach for displaying all the digital content within the virtual environment can diminish the impact of the presentation and fail to resonate with participants (e.g., audience). Furthermore, maintaining participant engagement in the VR environment can be difficult, particularly if they are unable to interact with the content or if the presentation does not cater to their interests and understanding. Additionally, in collaborative settings, varying levels of access to information among participants can complicate the presentation process and reduce its overall effectiveness.

The disclosed system addresses these challenges by enabling the presenters to configure how different types of digital content are displayed and interacted with, within the virtual environment. The presenters can upload any presentation file, such as PowerPoint®, which includes diverse digital content. The presenters have the flexibility to define specific display settings for each type of content, allowing for a customized presentation experience. The system also supports the incorporation of triggering events, where the presenters can specify verbal cues or gestures that prompt the system to display relevant content at the appropriate moment. This capability facilitates a more fluid presentation style, enhancing audience engagement and understanding. The system analyzes the presenter-configured display settings of the digital content and triggering events associated with the display of the digital content within the virtual environment to dynamically display the digital content in the virtual environment. This approach allows for a responsive presentation that enhances audience engagement and understanding.

Additionally, the system allows for customized navigation through the presentation that can be input data. The presenters can control how content is accessed and displayed, enabling the presenter to adapt their delivery based on the flow of the discussion. This dynamic approach promotes a more immersive experience as the presenters can guide participants through the material. Furthermore, the system includes permission management features, allowing the presenters to set different levels of access for the participants. This ensures that sensitive or complex information is only available to those who are prepared to engage with it, enhancing the overall learning environment. The system's customizable navigation and permission management empowers the presenters to adapt content delivery in real-time, bringing an immersive learning experience. The dynamic control ensures that participants engage with the appropriate information, enhancing comprehension and retention of the presentation.

Moreover, the participants are enabled with the ability to interact with the digital content within the virtual environment, promoting collaborative learning and exploration. This interactive element not only keeps participants engaged but also encourages teamwork and a deeper understanding of the digital content. Overall, the system not only addresses the inherent challenges of VR presentations but also leverages the immersive nature of the medium to enhance educational effectiveness and participant engagement. By improving the flexibility, interactivity, and accessibility of presentations, the system aims to create a more impactful and enjoyable learning experience. The system enhances the educational effectiveness of the presentation by leveraging the immersive qualities of the virtual environment to promote interactivity, collaboration, and accessibility. This leads to a more engaging and impactful learning experience for participants (e.g., the audience).

Traditional presentation systems often struggle with static content delivery, leading to latency and a lack of engagement. In contrast, the system utilizes real-time trigger-based display settings that allow the system to respond instantly to presenter cues, such as verbal commands or the gestures. This dynamic interaction requires robust computational resources, enabling the system to allocate processing power efficiently to various tasks. For example, when the presenter gestures to display a 3D model, the system quickly shifts resources to render the 3D model in a detailed and immersive manner. This process involves complex calculations for depth perception, lighting, and texture mapping, which are performed in real-time. By optimizing these processes, the system transitions between different types of content such as the text, the images, the videos, and the 3D models seamlessly and in an engaging manner.

The integration of customized navigation features further enhances the capabilities of the system. This functionality allows the presenters to control how content is accessed and displayed, dynamically adjusting the flow of the presentation based on participant interactions. The system further uses processes to analyze user engagement and the relevance of displayed content, enabling it to prioritize which elements require more computational resources at any given moment. For example, if the presenter decides to focus on a particular topic, the system allocates additional processing power to enhance the visual fidelity of related content (such as the rendered 3D model) while reducing resources allocated to less relevant elements (such as the rendered textual information). This adaptive resource management improves performance and enhances the overall user experience by keeping participants engaged and facilitating deeper exploration of the digital content. By integrating customized navigation and adaptive resource management, the processing of the system is significantly enhanced by dynamically allocating computational power to high-priority tasks, ensuring efficient performance. Further, data management of the system is optimized by analyzing user engagement in real-time, prioritizing relevant content, and reducing resource wasted.

Further, the processing efficiency of the system is enhanced by generating a distinct set of instructions tailored to each user device. For instance, the system produces a primary instruction for displaying digital content on a premium VR headset and a secondary instruction on a basic VR headset. If the primary instruction were applied to the basic VR headset, it might fail to render the digital content, necessitating the generation of a new instruction. By creating device-specific instructions based on individual device parameters, both processing and memory of the system are optimized.

Further, the system leverages advanced graphics processing units (GPUs) to handle the complex rendering required for an immersive virtual environment. The ability to manipulate the 3D models within the virtual environment necessitates high-performance GPUs. This results in system performing real-time calculations for simulations more effectively and efficiently, allowing participants to interact with the digital content by rotating, zooming, and examining the digital content from various angles. This interaction enhances participant engagement and understanding. Further, the implementation of permission management features allows the system to control access to sensitive or complex information. This capability requires the system to manage profiles of multiple participants and access levels efficiently, ensuring that the right information is delivered to the right participants at the right time. By managing profiles and access levels, the system allocates resources more effectively. This may further ensure that the computational power and data access of the system are optimized, preventing bottlenecks and maintaining high performance even in case of multiple users.

According to an embodiment of the disclosure, a computer-implemented method for the delivery of the digital content in the virtual reality session is described. The computer-implemented method includes receiving, by a computer, input data including digital content and configuration data. The configuration data is associated with the digital content. The computer-implemented method further includes determining, by the computer, rendering information associated with the digital content based on the configuration data. The rendering information includes one or more rendering characteristics for a display of the digital content within a virtual environment. The virtual environment is displayed on a first set of user devices and a second set of user devices. The computer-implemented method further includes generating, by the computer, a first set of instructions for each user device of the first set of user devices based on the rendering information. The first set of instructions is associated with the display of the digital content within the virtual environment on at least one user device of the first set of user devices. The computer-implemented method further includes generating, by the computer, a second set of instructions for each user device of the second set of user devices based on the rendering information. The second set of instructions is associated with the display of the digital content within the virtual environment on at least one user device of the second set of user devices. The computer-implemented method further includes outputting, by the computer, each instruction of the first set of instructions and each instruction of the second set of instructions for the display of the digital content within the virtual environment. The digital content is displayed on each user device of the first set of user devices and each user device of the second set of user devices.

In various embodiments of the disclosure, the computer-implemented method further includes obtaining, by the computer, one or more first device parameters associated with each user device of the first set of user devices. The computer-implemented method further includes generating, by the computer, the first set of instructions for each user device of the first set of user devices based on the one or more first device parameters. The computer-implemented method further includes outputting, by the computer, the first set of instructions in association with the input data on each user device of the first set of user devices.

In various embodiments of the disclosure, the computer-implemented method further includes obtaining, by the computer, one or more second device parameters associated with each user device of the second set of user devices. The computer-implemented method further includes generating, by the computer, the second set of instructions for each user device of the second set of user devices based on the one or more second device parameters. The computer-implemented method further includes outputting, by the computer, the second set of instructions in association with the input data on each user device of the second set of user devices.

In various embodiments of the disclosure, the configuration data includes one or more display attributes associated with the display of the digital content on each user device of the first set of user devices and each user device of the second set of user devices.

In various embodiments of the disclosure, the computer-implemented method further includes controlling, by the computer, each user device of the first set of user devices and each user device of the second set of user devices to display the digital content.

In various embodiments of the disclosure, each user device of the first set of user devices is associated with at least a first user. Each user device of the second set of user devices is associated with at least a second user.

In various embodiments of the disclosure, the computer-implemented method further includes receiving, by the computer, the input data from at least one user device of the first set of user devices.

In various embodiments of the disclosure, the computer-implemented method further includes determining, by the computer, trigger data associated with one or more trigger events based on the configuration data. The computer-implemented method further includes obtaining, by the computer, session data associated with an interaction session. The interaction session corresponds to an interaction between the virtual environment and at least one user of the first user or the second user. The computer-implemented method further includes identifying, by the computer, at least one trigger event of the one or more trigger events based on the session data and the trigger data. The computer-implemented method further includes updating, by the computer, each instruction of the first set of instructions and each instruction of the second set of instructions based on the at least one trigger event. The computer-implemented method further includes outputting, by the computer, each instruction of the updated first set of instructions and each instruction of the updated second set of instructions.

In various embodiments of the disclosure, the computer-implemented method further includes receiving, by the computer, gesture information associated with the first user of the at least one user device of the first set of user devices. The gesture information is received from at least one of one or more tracking devices associated with the first user, the first set of user devices, or the second set of user devices. The computer-implemented method further includes updating, by the computer, each instruction of the first set of instructions and each instruction of the second set of instructions based on the gesture information. The computer-implemented method further includes outputting, by the computer, at least one of the updated first set of instructions and the updated second set of instructions.

In various embodiments of the disclosure, the computer-implemented method further includes receiving, by the computer, movement data associated with a movement of a user associated with a user device. The user is one of the first user or the second user. The user device is associated with one of the first set of user devices or the second set of user devices. The computer-implemented method further includes obtaining, by the computer, device data associated with the user device. The device data indicates a movement of the user device and an operational status of the user device. The computer-implemented method further includes updating, by the computer, at least one of the first set of instructions or the second set of instructions based on the movement data and the device data. The computer-implemented method further includes outputting, by the computer, the at least one of the updated first set of instructions or the updated second set of instructions.

In various embodiments of the disclosure, the computer-implemented method further includes determining, by the computer, interaction data associated with an interaction between the display of the digital content within the virtual environment and at least one user of the first user or the second user. The computer-implemented method further includes updating, by the computer, at least one of the first set of instructions or the second set of instructions based on the interaction data. The computer-implemented method further includes outputting, by the computer, the at least one of the updated first set of instructions or the updated second set of instructions.

In various embodiments of the disclosure, the computer-implemented method further includes obtaining, by the computer, historical input data that includes a plurality of display instructions for a display of historical digital content and historical configuration data for the display of the historical digital content. The computer-implemented method further includes training, by the computer, an artificial intelligence (AI) model based on the historical input data. The computer-implemented method further includes applying, by the computer, the trained AI model on the configuration data associated with the digital content. The computer-implemented method further includes determining, by the computer, the rendering information based on the application of the trained AI model. The computer-implemented method further includes controlling, by the computer, each user device of the first set of user devices and each user device of the second set of user devices to display the digital content. The digital content is displayed based on the rendering information.

In various embodiments of the disclosure, the computer-implemented method further includes receiving, by the computer, request data from at least one user device of the first set of user devices or the second set of user devices. The request data is associated with a generation of the virtual environment. The computer-implemented method further includes generating, by the computer, the virtual environment based on the request data.

In various embodiments of the disclosure, the digital content corresponds to at least one of an image, a video, a three-dimensional (3D) object, an audio, or a text.

In various embodiments of the disclosure, each rendering characteristic of the one or more rendering characteristics corresponds to one of size information associated with the digital content, color information associated with the digital content, texture information associated with the digital content, or resolution information associated with the digital content.

According to one or more embodiments of the disclosure, a computer system for a delivery of digital content in a virtual reality session is disclosed. The computer system includes a processor set, one or more computer-readable storage media, and program instructions stored on the one or more computer-readable storage media. The program instructions are executable by the processor set to cause the processor set to receive input data including digital content and configuration data. The configuration data is associated with the digital content. The program instructions cause the processor set to determine rendering information associated with the digital content based on the configuration data. The rendering information includes one or more rendering characteristics for a display of the digital content within a virtual environment. The virtual environment is displayed on a first set of user devices and a second set of user devices. The program instructions cause the processor set to generate a first set of instructions for each user device of the first set of user devices based on the rendering information and one or more first device parameters. The program instructions cause the processor set to generate a second set of instructions for each user device of the second set of user devices based on the rendering information and one or more second device parameters. The program instructions cause the processor set to output each of the first set of instructions and each of the second set of instructions on each user device of the first set of user devices and each user device of the second set of user devices, respectively.

In various embodiments of the disclosure, each user device of the first set of user devices is associated with at least a first user. Each user device of the second set of user devices is associated with at least a second user.

In various embodiments of the disclosure, the program instructions further cause the processor set to receive the input data from at least one user device of the first set of user devices.

In various embodiments of the disclosure, the program instructions further cause the processor set to determine trigger data associated with one or more trigger events based on the configuration data. The program instructions further cause the processor set to obtain session data associated with an interaction session. The interaction session corresponds to an interaction between the virtual environment and at least one user of the first user or the second user. The program instructions further cause the processor set to identify at least one trigger event of the one or more trigger events based on the session data and the trigger data. The program instructions further cause the processor set to update each instruction of the first set of instructions and each instruction of the second set of instructions based on the at least one trigger event. The program instructions further cause the processor set to output each instruction of the updated first set of instructions and each instruction the updated second set of instructions.

According to one or more embodiments of the disclosure, a computer program product for a delivery of digital content in a virtual reality session is disclosed. The computer program product includes one or more computer-readable storage media and program instructions stored on the one or more computer-readable storage media to perform operations. The operations include receiving input data including digital content and configuration data. The configuration data is associated with the digital content. The operations further include determining rendering information associated with the digital content based on the configuration data. The rendering information includes one or more rendering characteristics for a display of the digital content within a virtual environment. The virtual environment is displayed on a first set of user devices and a second set of user devices. The operations further include generating a first set of instructions for each user device of the first set of user devices based on the rendering information. The first set of instructions is associated with the display of the digital content within the virtual environment on at least one user device of the first set of user devices. The operations further include generating a second set of instructions for each user device of the second set of user devices based on the rendering information. The second set of instructions is associated with the display of the digital content within the virtual environment on at least one user device of the second set of user devices. The operations further include outputting each instruction of the first set of instructions and the second set of instructions for the display of the digital content within the virtual environment. The digital content is displayed on each user device of the first set of user devices and each user device of the second set of user devices.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
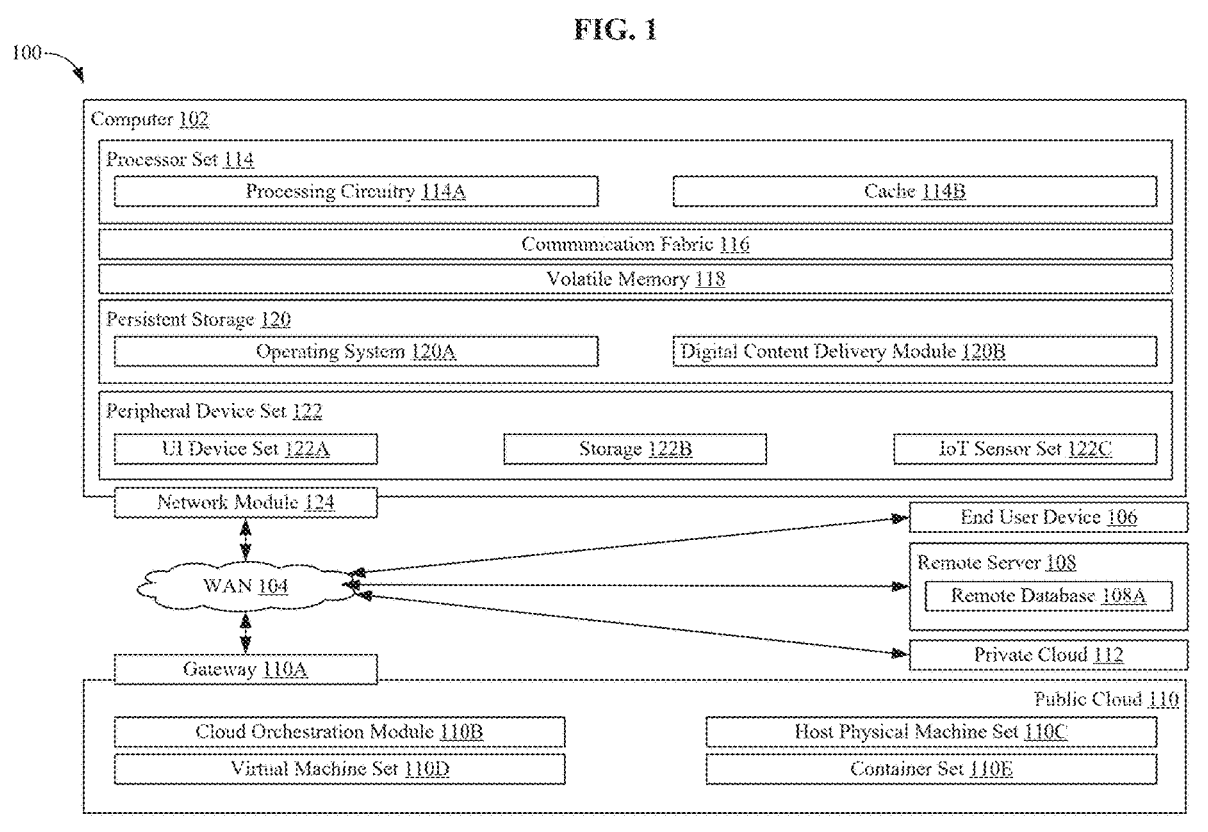

FIG. 1 is a diagram that illustrates a computing environment for the delivery of digital content in a virtual reality session, in accordance with an embodiment of the disclosure. With reference to FIG. 1, there is shown a computing environment 100 that contains an example of an environment for execution of at least some of the computer code/module involved in performing the methods, such as a digital content delivery module 120B. In addition to the digital content delivery module 120B, computing environment 100 includes, for example, a computer 102, a wide area network (WAN) 104, an end user device (EUD) 106, a remote server 108, a public cloud 110, and a private cloud 112. In this embodiment of the disclosure, the computer 102 includes a processor set 114 (including a processing circuitry 114A and a cache 114B), a communication fabric 116, a volatile memory 118, a persistent storage 120 (including an operating system 120A and the digital content delivery module 120B, as identified above), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or other wearable computer, a mainframe computer, a quantum computer, or any other form of a computer or a mobile device now known or to be developed in the future that is capable of running a program, accessing a network or querying a database, such as a remote database 108A. As is well understood in the art of computer technology, and depending upon the technology, the performance of a computer-implemented method may be distributed among multiple computers and/or between multiple locations. On the other hand, in this presentation of the computing environment 100, detailed discussion is focused on a single computer, specifically the computer 102, to keep the presentation as simple as possible. The computer 102 may be located in a cloud, even though it is not shown in a cloud in FIG. 1. On the other hand, computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, some, or all, of the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby effect a computer-implemented method, such that the instructions thus executed will instantiate the methods specified in flowcharts and/or narrative descriptions of computer-implemented methods included in this document (collectively referred to as "the methods"). These computer-readable program instructions are stored in various types of computer-readable storage media, such as the cache 114B and the other storage media discussed below. The program instructions, and associated data, are accessed by the processor set 114 to control and direct the performance of the methods. In computing environment 100, at least some of the instructions for performing the methods may be stored in the dynamic modification of the digital content delivery module 120B in persistent storage 120.

The communication fabric 116 is the signal conduction path that allows the various components of computer 102 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to computer 102, but alternatively or additionally, the volatile memory 118 may be distributed over multiple packages and/or located externally with respect to computer 102.

The persistent storage 120 is any form of non-volatile storage for computers that is now known or to be developed in the future. The non-volatility of this storage means that the stored data is maintained regardless of whether power is being supplied to computer 102 and/or directly to the persistent storage 120. The persistent storage 120 may be a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the digital content delivery module 120B typically includes at least some of the computer code involved in performing the disclosed methods.

The peripheral device set 122 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In some embodiments of the disclosure, storage 122B may take the form of a quantum computing storage device for storing data in the form of qubits. In embodiments of the disclosure where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that can be used in Internet of Things applications. For example, one sensor may be a thermometer, and other sensor may be a motion detector.

The network module 124 is the collection of computer software, hardware, and firmware that allows computer 102 to communicate with other computers through WAN 104. The network module 124 may include hardware, such as modems or Wi-Fi signal transceivers, software for packetizing and/or de-packetizing data for communication network transmission, and/or web browser software for communicating data over the internet. In some embodiments of the disclosure, network control functions, and network forwarding functions of the network module 124 are performed on the same physical hardware device. In an embodiment of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods can typically be downloaded to computer 102 from an external computer or external storage device through a network adapter card or network interface included in the network module 124.

The WAN 104 is any wide area network (for example, the internet) capable of communicating computer data over non-local distances by any technology for communicating computer data, now known or to be developed in the future. In some embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates computer 102) and may take any of the forms discussed above in connection with computer 102. The EUD 106 typically receives helpful and useful data from the operations of computer 102. For example, in a hypothetical case where computer 102 is designed to provide a recommendation to an end user, this recommendation would typically be communicated from the network module 124 of computer 102 through WAN 104 to EUD 106. In this way, the EUD 106 can display, or otherwise present recommendations to an end user. In some embodiments of the disclosure, EUD 106 may be a client device, such as a thin client, heavy client, mainframe computer, desktop computer, and so on.

The remote server 108 is any computer system that serves at least some data and/or functionality to the computer 102. The remote server 108 may be controlled and used by the same entity that operates the computer 102. The remote server 108 represents the machine(s) that collect and store helpful and useful data for use by other computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or other computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows public cloud 110 to communicate through WAN 104.

Some further explanation of virtualized computing environments (VCEs) will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 112 is similar to public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

FIG. 2 is a diagram that illustrates an environment for delivery of digital content in a virtual reality session, in accordance with an embodiment of the disclosure. FIG. 2 is explained in conjunction with elements from FIG. 1. With reference to FIG. 2, there is shown a diagram of a network environment 200. The network environment 200 includes a system 202, a first set of user devices 204A, a second set of user devices 204B, and a virtual environment 206. The system 202 further includes an Artificial Intelligence (AI) model 202A, a first set of instructions 202B, and a second set of instructions 202C. The network environment 200 further includes input data 208. The input data further includes the digital content 208A and the configuration data 208B. The network environment 200 further includes a first user 210A associated with the first set of user devices 204A, and a second user 210B associated with the second set of user devices 204B. The network environment 200 further includes the WAN 104 of FIG. 1.

The system 202 may include suitable logic, circuitry, interfaces, and/or code that may be configured for displaying digital content in a virtual reality session. In an embodiment, the system 202 is configured to receive the input data 208 including the digital content 208A and the configuration data 208B. The configuration data is associated with the digital content 208A. Further, the system 202 is configured to determine rendering information associated with the digital content 208A based on the configuration data 208B. The rendering information includes one or more rendering characteristics for a display of the digital content 208A within the virtual environment 206. The virtual environment 206 is to be displayed on the first set of user devices 204A and the second set of user devices 204B. In an embodiment, the system 202 is further configured to generate the first set of instructions 202B for each user device of the first set of user devices 204A based on the rendering information. The first set of instructions 202B is associated with the display of the digital content 208A within the virtual environment 206 on at least one user device of the first set of user devices 204A. Further, the system 202 is configured to generate the second set of instructions 202C for each user device of the second set of user devices 204B based on the rendering information. The second set of instructions 202C is associated with the display of the digital content 208A within the virtual environment 206 on at least one user device of the second set of user devices 204B. The system 202 is further configured to output each set of instructions of the first set of instructions 202B and the second set of instructions 202C for the display of the digital content 208A within the virtual environment 206.

In an embodiment, the system 202 may deployed as a cloud-based solution, leveraging a network of remote server 108, or the system 202 may be deployed on a dedicated on-premises server. The first set of user devices 204A and the second set of user devices 204B may be connected to the system 202 via the WAN 104, facilitating efficient communication and data exchange ensuring scalability and flexibility.

In an embodiment, the system 202 includes the Artificial Intelligence (AI) Model 202A. The AI model 202A may be a mathematical representation or computational framework designed to perform specific tasks by processing the input data 208. The AI model 202A may be trained using a process that enables the AI model 202A to learn patterns and relationships within the input data 208. In an embodiment, the AI model 202A may be, such as, but not limited to, neural networks, decision trees, or support vector machines, and are used in applications like classification, regression, and reinforcement learning.

In an embodiment, the AI model 202A is utilized to analyze the input data 208. The configuration data 208B is associated with the digital content 208A. In an exemplary embodiment, the configuration data 208B associated with the digital content 208A may include textual data associated with the digital content 208A or metadata associated with the digital content 208A. The AI model 202A utilizes various processes such as, but not limited to semantic parsing, pattern recognition, contextual analysis, and multimodal data processing to interpret instructions, objectives, or insights from diverse formats. The configuration data 208B may include comments, notes, directives, or annotations within the input data 208.

In an embodiment, the AI model 202A may dynamically adapt the analysis to different contexts or tasks, transforming the interpreted data into structured outputs or actions suitable for a range of applications such as, but not limited to, virtual displays, three-dimensional (3D) rendering, or interactive environment. The AI model 202A may utilize Natural Language Understanding (NLU) and multimodal, enabling seamless translation of human input into actionable responses that can be executed by the system 202.

In an embodiment, the virtual environment 206 may be a simulated space that can be experienced through immersive technologies, encompassing both Augmented Reality (AR) and Virtual Reality (VR). In VR, a fully immersive experience is created, often through headsets, where users are transported to a digital world (such as the virtual environment 206), interacting with 3D objects and environments. Alternatively, AR overlays digital content onto the real world, enhancing the user's perception of their physical surroundings by integrating virtual elements in real time. Both approaches aim to create interactive experiences that enhance perception, engagement, and understanding of information within a simulated context.

In an embodiment, the first set of user devices 204A and the second set of user devices 204B may correspond to hardware or software interfaces that may enable users to interact with the virtual environment 206, allowing them to experience, navigate, and manipulate digital content 208A. Further, each user device of the first set of user devices 204A and the second set of user devices 204B may correspond to an AR device or a VR device. For example, each user device of the first set of user devices 204A and each user device of the second set of user devices 204B may be one of, a Virtual Reality (VR) headset, Augmented Reality (AR) glasses, a smartphone, a tablet, motion controllers, haptic feedback devices, a desktop, or a game console.

In operation, for the delivery of digital content 208A in the virtual reality session, the system 202 is configured to receive the input data 208 including the digital content 208A and the configuration data 208B. The configuration data 208B is associated with the digital content 208A. In an embodiment, the system 202 receives the input data 208 from at least one user device of the first set of user devices 204A. Further, each user device of the first set of user devices 204A is associated with at least a first user 210A.

Further, the digital content 208A within the input data 208 may correspond to at least one of an image, a video, a three-dimensional (3D) object, an audio, or a text. The configuration data 208B associated with the digital content 208A is indicative of metadata associated with the digital content 208A. The metadata associated with the digital content 208A may be indicative of how the digital content 208A will be displayed within the virtual environment 206. In an exemplary embodiment, the first user 210A associated with the user device of the first set of user devices 204A defines the configuration data 208B associated with the digital content 208A that is within the input data 208. In an embodiment, the configuration data 208B may include one or more display attributes associated with the display of the digital content 208A on each user device of the first set of user devices 204A and each user device of the second set of user devices 204B. The one or more display attributes may be indicative of various characteristics that define how the digital content 208A is to be displayed within the virtual environment 206 on each user device of the first set of user devices 204A and each user device of the second set of user devices 204B. In an example, the one or more display attributes may be, but are not limited to, position information associated with the display of the digital content 208A, orientation information associated with the display of the digital content 208A, and visibility information associated with the display of the digital content 208A.

Further, upon the reception of the input data 208, the system 202 is configured to determine the rendering information associated with the digital content 208A based on the configuration data 208B. The rendering information associated with the digital content 208A includes one or more rendering characteristics for the display of the digital content 208A within the virtual environment 206. In an embodiment, the virtual environment 206 is displayed on the first set of user devices 204A and the second set of user devices 204B.

In an exemplary embodiment, each rendering characteristic of the one or more rendering characteristics may correspond to one of size information associated with the digital content 208A, color information associated with the digital content 208A, texture information associated with the digital content 208A, or resolution information associated with the digital content 208A. In an embodiment, the size information may correspond to dimensions of the digital content 208A (such as width, height, and depth) that is to be displayed within the virtual environment 206. Further, the color information corresponds to saturation, brightness, and overall color palette of the digital content 208A to be displayed within the virtual environment 206. The texture information corresponds to the surface properties of the digital content 208A that is to be displayed within the virtual environment 206. The texture information may include patterns, materials, and surface details of the digital content 208A. The resolution information indicates a level of detail and clarity of the digital content 208A, often defined by the number of pixels or points of detail in a given area. This characteristic impacts how sharp or blurry the digital content 208A may appear within the virtual environment 206, influencing the overall quality of visual experience in the virtual environment 206.

In an embodiment, upon the determination of the rendering information based on the configuration data 208B, the system 202 is further configured to generate the first set of instructions 202B for each user device of the first set of user devices 204A based on the rendering information. The first set of instructions 202B is associated with the display of the digital content 208A within the virtual environment 206 on at least one user device of the first set of user devices 204A.

In an exemplary scenario, the input data 208 corresponds to the PPT® file that includes the digital content 208A. The digital content 208A includes an image of a mountain (say Mount Everest) and textual information associated with the mountain. The input data 208 further includes the configuration data 208B that includes the one or more display attributes associated with the display of the mountain within the virtual environment 206 on each user device of the first set of user devices 204A and each user device of the second set of user devices 204B. Additionally, the system 202 determines the rendering information associated with the display of the image of the mountain and the display of the textual information of the mountain. The configuration data 208B indicates that the image is to be displayed in front of the avatar of the first user 210A within the virtual environment and the textual information is to be displayed on a virtual screen within the virtual environment 206. Based on the one or more rendering characteristics and the one or more display attributes, the system 202 generates the first set of instructions 202B for each user device of the first set of user devices 204A and the second set of instructions 202C for each user device of the second set of user devices 204B.

In an embodiment, upon the determination of the rendering information based on the configuration data 208B, the system 202 is further configured to generate the second set of instructions 202C for each user device of the second set of user devices 204B based on the rendering information. The second set of instructions 202C is associated with the display of the digital content 208A within the virtual environment 206 on at least one user device of the second set of user devices 204B. In an exemplary embodiment, the system 202 generates the second set of instructions 202C similar to the generation of the first set of instructions 202B. In an exemplary embodiment, the system 202 generates the first set of instructions 202B and the second set of instructions 202C simultaneously.

Further, upon the generation of the first set of instructions 202B and the generation of the second set of instructions 202C, the system 202 is configured to output each instruction of the first set of instructions 202B and each instruction of the second set of instruction 202C for the display of the digital content 208A within the virtual environment 206. In an embodiment, the system 202 is configured to output the first set of instructions 202B and the second set of instructions 202C simultaneously.

In an exemplary embodiment, a first instruction of the first set of instructions 202B corresponds to the display of the digital content 208A on a first user device of the first set of user devices 204A. Further, a first instruction of the second set of instructions 202C corresponds to the display of the digital content 208A on a first user device of the second set of user devices 204B. The system 202 outputs the first instruction of the first set of instructions 202B to the first user device of the first set of user devices 204A associated with the first user 210A. The system 202 further outputs the first instruction of the second set of instructions 202C to the first user device of the second set of user devices 204B associated with the second user 210B.

Figure 3:
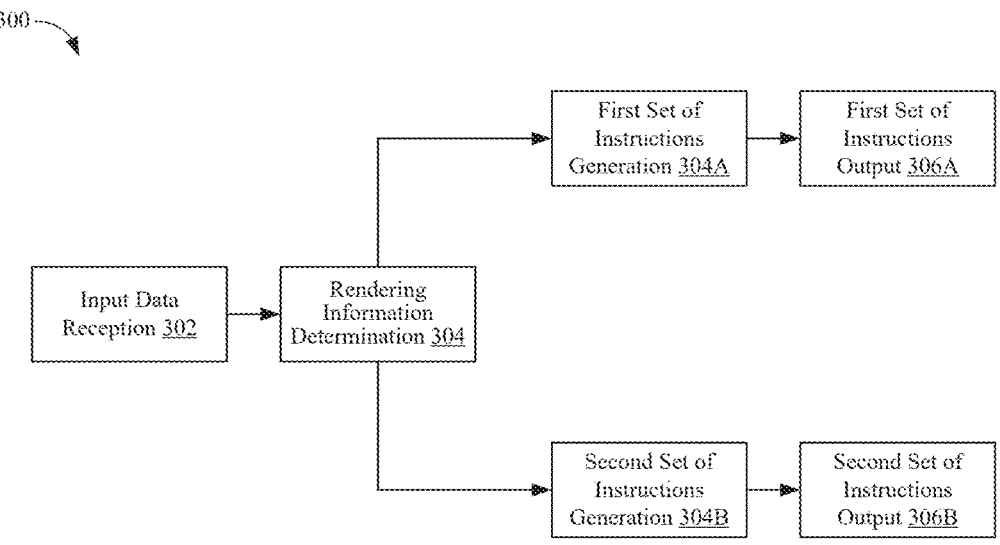
FIG. 3 is a diagram that illustrates one or more operations performed by the system for the delivery of the digital content in the virtual reality session, in accordance with an embodiment of the disclosure.

FIG. 3 is a diagram 300 that illustrates one or more operations performed by the system 202 for delivery of the digital content 208A in the virtual reality session, in accordance with an embodiment of the disclosure. FIG. 3 is explained in conjunction with elements from FIG. 1, and FIG. 2. With reference to FIG. 3, the operations may start at 302.

At 302, an input data reception operation is executed. In the input data reception operation, the system 202 is configured to receive the input data 208 from a first user 210A associated with the first set of user devices 204A.

In an exemplary scenario, the first user 210A wants to present a presentation on a topic such as, but not limited to, marine life within the virtual environment 206. For the presentation, the first user 210A prepares a file that may correspond to a (PowerPoint Presentation) PPT® file. In this scenario, the PPT® file corresponds to the input data 208. The PPT® file includes digital content 208A that corresponds to one or more images associated with the marine life, one or more videos associated with the marine life, and textual information associated with the marine life. Further, the PPT® file includes the configuration data 208B associated with the digital content 208A. Further, a first slide of the PPT® includes an image of a coral reef and information associated with the coral reef in textual format. The first user 210A attaches a first comment associated with the image of the coral reef. For example, the first comment indicates that the image of the coral reef needs to be displayed in a 3D format in front of the avatar of the first user within the virtual environment 206. Further, the first user 210A attaches a second comment associated with the textual information of the coral reef. For example, the second comment indicates that the textual information of the coral reef needs to be displayed on a virtual screen within the virtual environment 206. The first user 210A may further add one or more comments associated with the size information, the color information, the resolution information, and the texture information of each of the one or more images of the coral reef. In an embodiment, the configuration data 208B includes the first comment of the one or more comments and the second comment of the one or more comments.

At 304, a rendering information determination operation is executed. In the rendering information determination operation, the system 202 is configured to determine the rendering information associated with the digital content 208A based on the configuration data 208B. In an embodiment, the rendering information includes the one or more rendering characteristics for the display of the digital content 208A within the virtual environment 206. The virtual environment 206 is displayed on the first set of user devices 204A and the second set of user devices 204B.

In an exemplary scenario, once the system 202 receives the input data 208 corresponding to the PPT® file on the marine life, the system 202 is configured to determine the rendering information associated with the digital content 208A (such as the coral reef) present in the PPT® file. The rendering information includes the one or more rendering characteristics for the display of the coral reef within the virtual environment 206. The system 202 determines the one or more rendering characteristics based on the configuration data 208B of the digital content 208A (such as coral reef). In this scenario, the system 202 determines that the one or more images of the coral reef that are in the first slide of the PPT® file are required to be displayed in 3D in front of the avatar of the first user 210A within the virtual environment 206 and the textual information associated with the coral reef needs to be displayed on the virtual screen within the virtual environment 206.

Further, the system 202 analyzes the configuration data 208B (such as comments and notes) provided by the first user 210A within the first slide of the PowerPoint presentation (PPT)® file to determine the one or more rendering characteristics associated with the one or more images and the textual information of the coral reef. The one or more rendering characteristics include the size information of the digital content 208A that is to be displayed within the virtual environment 206, the color information of the digital content 208A that is to be displayed within the virtual environment 206, the texture information of the digital content 208A that is to be displayed within the virtual environment 206, and the resolution information of the digital content 208A that is to be displayed within the virtual environment 206. Based on this analysis, the system 202 renders the one or more images and the textual information within the virtual environment 206, ensuring that the visual representation of the coral reef aligns with the rendering characteristics. For example, the first user 210A specifies that the image of the coral reef should be displayed at a width of 800 pixels and a height of 600 pixels. Further, the first user 210A specifies within the first slide of the PPT® file that the coral reef should feature vibrant colors, specifically mentioning a bright turquoise (Red Green Blue (RGB) 64, 224, 208) for water and various shades of orange (RGB 255, 165, 0) for coral.

Further, the first user 210A specifies within the first slide of the PPT® file that the coral reef should have a textured appearance, with details such as a rough surface for the coral and smooth gradients for the water, suggesting the use of a texture map with intricate patterns. The first user 210A further specifies within the first slide of the PPT® file that the image should be rendered at a high resolution of 300 Dots Per Inch (DPI) to ensure clarity and detail, particularly for close-up views. The system 202 determines one or more rendering characteristics for the display of the coral reef within the virtual environment 206. The virtual environment 206 is displayed on the first set of user devices 204A and the second set of user devices 204B. The ability of the system 202 to determine the rendering information associated with the digital content 208A based on the configuration data

208B allows for real-time rendering of the digital content 208A within the virtual environment 206.

At 304A, a first set of instructions generation operation is executed. In the first set of instructions generation operation, the system 202 is configured to generate the first set of instructions for each user device of the first set of user devices 204A based on the rendering information. The first set of instructions 202B is associated with the display of the digital content 208A within the virtual environment 206 on at least one user device of the first set of user devices 204A.

In an exemplary scenario, once the system 202 determines the rendering information associated with the digital content 208A of the input data 208 (such as the PPT® file), the system 202 generates the first set of instructions 202B for the display of the digital content 208A within the virtual environment 206 on at least one user device of the first set of user devices 204A based on the rendering information. In an exemplary embodiment, the system 202 utilizes the AI model 202A for the analysis of the input data 208 and the generation of the first set of instructions 202B. In an embodiment, the system 202 is configured to generate the first instruction of the first set of instructions 202B for the first user device of the first set of user devices 204A. The first set of instructions 202B associated with the first user device of the first set of user devices 204A is indicative of how the digital content 208A is to be displayed within the virtual environment 206 associated with the first user device of the first set of user devices 204A.

For example, the first instruction of the first set of instructions 202B associated with the first user device of the first set of user devices 204A indicates that the size information of the one or more images of the coral reef on the first slide of the PPT® file corresponds to the width of 800 pixels and the height of 600 pixels. Further, a first instruction of the first set of instructions 202B associated with a second user device of the first set of user devices 204A indicates that the size information of the one or more images of the coral reef on the first slide of the PPT® file corresponds to the width of 700 pixels and the height of 500 pixels. In this scenario, the one or more images of the coral reef are displayed with the width of 800 pixels and the height of 600 pixels on the first user device of the first set of user devices 204A and the one or more images of the coral reef are displayed with the width of 700 pixels and the height of 500 pixels on the second user device of the first set of user devices 204B. Similarly, the system 202 generates the first set of instructions for each user device of the first set of user devices 204A.

In some embodiments, the generation of the first set of instructions 202B for each user device of the first set of user devices 204A further depends on one or more first device parameters associated with each user device of the first set of user devices 204A. The system 202 is configured to obtain the one or more first device parameters associated with each user device of the first set of user devices 204A. In an exemplary embodiment, the system 202 obtains the one or more first device parameters from a user associated with the corresponding user device of the first set of user devices 204A. In an alternate exemplary embodiment, the system 202 obtains the one or more first device parameters from one or more sources such as, but not limited to, a database that stores information associated with the first set of user devices 204A and the second set of user devices 204B. The one or more first device parameters may be, for example, but not limited to, a device entitlement associated with each user device of the first set of user devices 204A, a functionality associated with each user device of the first set of user devices 204A, resolution associated with each user device of the first set of user devices 204A, and refresh rate associated with each user device of the first set of user devices 204A.

In an embodiment, the device entitlement indicates permissions and access rights associated with each user device of the first set of user devices 204A. The device entitlement indicates what features and digital content the user associated with the first set of user devices 204A can utilize. It ensures that only authorized devices can access specific functionalities within the virtual environment 206.

Further, the functionality associated with each user device of the first set of user devices 204A is indicative of capabilities and features of each user device of the first set of user devices 204A, such as, but not limited to, gesture recognition, voice commands, or haptic feedback. Further, the resolution associated with each user device of the first set of user devices 204A is indicative of a pixel density of display of each user device of the first set of user devices 204A, affecting the clarity and detail of the visual representation of the digital content 208A. Further, the refresh rate associated with each user device of the first set of user devices 204A is indicative of how many times per second the display updates the image, measured in Hertz (Hz).

The system 202 is configured to generate the first instruction of the first set of instructions 202B associated with the size information of the one or more images of the coral reef for the first user device of the first set of user devices based on the rendering information and the obtained one or more first device parameters. Similarly, the system 202 is configured to generate each instruction of the first set of instructions 202B for each user device of the first set of user devices 204A. In an embodiment, one or more user devices of the first set of user devices 204A (e.g., the tablet, the laptop, or the VR headset) have varying display resolutions, processing capabilities, and interaction methods. By generating the first set of instructions 202B tailored to each device of the first set of user devices 204A, the system 202 ensures that the digital content 208A is rendered in the most effective manner, enhancing visual clarity and performance.

At 306A, a first set of instructions output operation is executed. In the first set of instructions output operation, the system 202 is configured to output the generated first set of instructions 202B on each user device of the first set of user devices 204A for the display of the digital content within the virtual environment 206.

In some exemplary scenario, the system 202 is configured to utilize application programming interfaces (APIs) to send the generated first set of instructions 202B to each user device of the first set of user devices 204A. The utilization of the APIs to send the generated first set of instructions 202B allows for real-time updates and ensures that each user device receives the correct first set of instructions 202B.

In some exemplary scenario, the system 202 may leverage network protocols (such as, Hypertext Transfer Protocol (HTTP), or WebSocket) to transmit the first set of instructions 202B instructions over a local or the cloud-based server. Each user device of the first set of user devices 204A may connect to this server to receive the generated first set of instructions 202B for displaying the digital content 208A within the virtual environment 206.

In some exemplary scenario, the system 202 implements push notification services to inform each user device of the first set of user devices 204A of the generated first set of instructions 202B. Upon receiving a notification, each user device retrieves and executes the corresponding instruction for displaying the digital content 208A within the virtual environment 206.

At 304B, a second set of instructions generation operation is executed. In the second set of instructions generation operation, the system 202 is configured to generate the second set of instructions 202C for each user device of the second set of user devices 204B based on the rendering information. The second set of instructions 202C is associated with the display of the digital content 208A within the virtual environment 206 on at least one user device of the second set of user devices 204B.

In an exemplary scenario, once the system 202 determines the rendering information associated with the digital content 208A of the input data 208 (such as the PPT® file), the system 202 generates the second set of instructions 202C for the display of the digital content 208A within the virtual environment 206 on at least one user device of the second set of user devices 204B based on the rendering information. In an embodiment, the process of generation of the second set of instructions 202C is similar to the process of the generation of the first set of instructions as in step 304A. For the sake of brevity, we are not explaining the process in detail.

In an alternate embodiment, the generation of the second set of instructions 202C for each user device of the second set of user devices 204B further depends on one or more second device parameters associated with each user device of the second set of user devices 204B. The system 202 is configured to obtain the one or more second device parameters associated with each user device of the second set of user devices 204B. In an embodiment, the process of the generation of the second set of instructions 202C for each user device of the second set of user devices 204B based on the one or more second device parameters, is similar to the process of the generation of the first set of instructions 202B for each user device of the first set of user devices 204A based on the one or more first device parameters. For the sake of brevity, the process of the generation of the second set of instructions 202C is not explained in detail. In an example, the one or more second device parameters may be similar to the one or more first device parameters. For the sake of brevity, we are not explaining this process in detail. In an embodiment, the system 202 generates the first set of instructions 202B and the second set of instructions 202C simultaneously.

In an embodiment, one or more user devices of the second set of user devices 204B (e.g., the tablet, the laptop, or the VR headset) have varying display resolutions, processing capabilities, and interaction methods. By generating the second set of instructions 202C tailored to each device of the second set of user devices 204B, the system 202 ensures that the digital content 208A is rendered in the most effective manner, enhancing visual clarity, and performance. At 306B, a second set of instructions output operation is executed. In the second set of instructions output operation, the system 202 is configured to output the generated second set of instructions 202C on each user device of the second set of user devices 204B for the display of the digital content 208A within the virtual environment 206. In an embodiment, the system 202 outputs the first set of instructions 202B and the second set of instructions 202C simultaneously. In an embodiment, the system 202 executes the second set of instructions output operation similar to the execution of the first set of instructions output operation described at step 306A.

Figure 4:
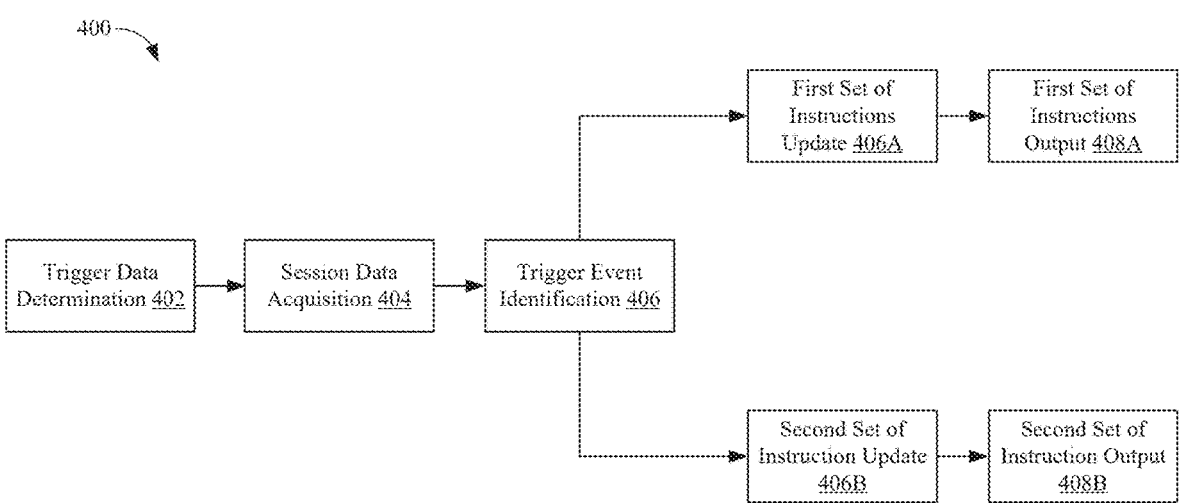
FIG. 4 is a diagram that illustrates one or more operations performed by the system for identifying one or more trigger events within the input data, in accordance with an embodiment of the disclosure.

FIG. 4 is a diagram 400 that illustrates one or more operations performed by the system 202 for identifying one or more trigger events within the input data 208, in accordance with an embodiment of the disclosure. FIG. 4 is explained in conjunction with elements from FIG. 1, FIG. 2, and FIG. 3. With reference to FIG. 4, the operations may start at 402.

At 402, a trigger data determination operation is executed. In the trigger data determination operation, the system 202 is configured to determine trigger data associated with one or more trigger events based on the configuration data 208B.

In an exemplary scenario, the first user 210A associated with the first set of user devices 204A wants to present the presentation on the topic of the marine life to the second user 210B associated with the second set of user devices 204B within the virtual environment 206. The system 202 receives the input data 208 (such as the PPT® file on the marine life) from the first set of user devices 204A associated with the first user. Further, as the PPT® file is to be presented in the virtual environment 206, the system 202 is required to generate the virtual environment 206 between the first set of user devices 204A and the second set of user devices 204B. To generate the virtual environment 206 between the first user 210A associated with the first set of user devices 204A and the second user associated with the second set of user devices 204B, the system 202 receives request data from at least one user device of the first set of user devices 204A or the second set of user devices 204B. The request data is associated with the generation of the virtual environment 206 between the first set of user devices 204A and the second set of user devices 204B. Further, once the system 202 receives the request data, the system 202 generates the virtual environment 206.

Further, upon the generation of the virtual environment 206, while the PPT® file is being presented within the virtual environment 206, the first user 210A associated with the first set of user devices 204A may require the digital content 208A within the input data 208 to be displayed in a designated format. For example, the one or more images associated with the coral reef need to be displayed in 3D format, while the textual information associated with the coral reef needs to be displayed on the virtual screen present within the virtual environment 206. To determine how the digital content 208A is to be displayed within the virtual environment 206, the system 202 is configured to determine the configuration data 208B. Further, the configuration data 208B includes the one or more trigger events that are defined by the first user of the first set of user devices 204A. By way of example and not by limitation, the configuration data 208B associated with the digital content 208A within the first slide of the PPT® file includes a first trigger event and a second trigger event. The first trigger event corresponds to the action that initiates the display of the coral reef in a 3D format in front of the avatar of the first user within the virtual environment 206. Further, the second trigger event corresponds to the action that initiates the display of an image of a shark being displayed in 3D format in front of the avatar of the first user 210A within the virtual environment 206. Similarly, the system 202 is configured to determine the trigger data associated with the one or more trigger events on each slide of the PPT® file. In an embodiment, by determining trigger data based on configuration data, the system 202 can respond to specific user actions or events in real-time. This may further ensure that the virtual environment 206 is relevant and enhances understanding of the subject matter (that may be current slide of the PPT® file displayed within the virtual environment 206).

At 404, a session data acquisition operation is executed. In the session data acquisition operation, the system 202 is configured to obtain the session data associated with the interaction session upon the determination of the trigger data at 402. The interaction session corresponds to an interaction between the virtual environment 206 and at least one user of the first user or the second user.

In an exemplary scenario, the first user associated with the first set of user devices 204A and the second user associated with the second set of user devices 204B is interacting with the digital content 208A displayed within the virtual environment 206. For example, the first slide of the PPT® file is displayed within the virtual environment 206 and the image of the coral reef is displayed in the 3D in front of the avatar of the first user 210A. Further, the system 202 receives a request from the first user 210A to navigate to a second slide associated with the PPT® file. The second slide associated with the PPT® file corresponds to a slide that includes textual information about dolphins, and one or more images and videos of the dolphins swimming in a water body. Upon receiving the request associated with the navigation, the system 202 navigates from the first slide to the second slide. The navigation made by the system 202 from the first slide of the PPT® file to the second slide of the PPT® file may correspond to the session data.

In an embodiment, to navigate from the first slide to the second slide, the system 202 is configured to receive gesture information associated with the first user 210A of the at least one user device of the first set of user devices 204A. The gesture information is received from at least one of one or more tracking devices associated with the first user 210A, the first set of user devices 204A, and the second set of user devices 204B. In an embodiment, the one or more tracking devices may be, for example, but are not limited to, optical motion trackers, Inertial Measurement Units (IMUs), depth cameras, leap motion controllers, and gesture recognition gloves. In an embodiment, the system 202 receives the gesture information associated with the first user 210A from one or more sensors associated with the user device of the first set of user devices 204A or the user devices associated with the second set of user devices 204B.

By way of example and not by limitation, the one or more tracking devices detect a gesture made by the first user 210A. The system 202 determines that the gesture information associated with the gesture indicates a "left swipe" hand gesture. The "left swipe" hand gesture indicates that the first user 210A wants to navigate to the second slide of the PPT® file from the first slide of the PPT® file. Further, to facilitate this navigation, the system 202 updates each instruction of the first set of instructions 202B and each instruction of the second set of instructions 202C. For example, at a first time period, the first set of instructions 202B and the second set of instructions 202C are indicative of displaying the digital content 208A associated with the first slide on the first set of user devices 204A and the second set of user devices 204B, respectively within the virtual environment.

Further, to facilitate the navigation at a second time period from the first slide to the second slide, the system 202 updates each instruction of the first set of instructions 202B and each instruction of the second set of instructions 202C. At the second time period, the first set of instructions 202B and the second set of instructions 202C are associated with the display of the digital content 208A associated with the second slide of the PPT® file on the first set of user devices 204A and the second set of user devices 204B, respectively within the virtual environment 206. Further, the system 202 is configured to output at least one of the updated first set of instructions 202B and the updated second set of instructions 202C. In an embodiment, the updated first set of instructions 202B is outputted on at the least one user device of the first set of user devices 204A. The updated set of instructions 202C is outputted on at least one user device of the second set of user devices 204B. The capability of the system 202 to acquire session data associated with user interactions within the virtual environment 206 allows for comprehensive tracking and analysis of user behavior, preferences, and engagement levels during the interaction session.

At 406, a trigger event identification operation is executed. In the trigger event identification operation, the system 202 is configured to identify at least one trigger event of the one or more trigger events based on the session data and the trigger data upon completion of the navigation and acquisition of the session data.

By way of example and not by limitation, the first user 210A defined a first trigger event and a second trigger even associated with the second slide of the PPT® file. As described in 404, the second slide of the PPT® file includes the textual information associated with the dolphins and one or more images and videos associated with the dolphins swimming in the water body. In an exemplary scenario, the first trigger event associated with the second slide is indicative of a first image of the one or more images of the dolphins to be displayed in 3D in front of the avatar of the first user 210A. Further, the second trigger event associated with the second slide indicates that if the system 202 detects a pre-defined phrase from the first user 210A where the pre-defined phrase may correspond to "dolphins swimming in an ocean", then the system 202 identifies that the second trigger event is identified. In an embodiment, phrase detection may utilize natural language processing (NLP) process to analyze the first user 210A verbal input and match it against a set of predefined commands or keywords. Upon successful recognition of the pre-defined phrase, the system 202 executes the associated actions for the second trigger event.

In an embodiment, the system 202 is configured to utilize the session data associated with the interaction session between the virtual environment 206 and at least one user of the first user 210A or the second user 210B. By way of example and not by limitation, the system 202 receives the session data associated with the interaction session in real-time. To update each instruction of the first set of instructions 202B, the control may pass to 406A.

At 406A, a first set of instructions update operation is executed. In an embodiment, the system 202 is configured to execute the first set of instructions update operation upon completion of the trigger event identification operation at 406. The system 202 is configured to update each instruction of the first set of instructions 202B. For example, at a first timestamp, the first set of instructions 202B are generated according to the one or more trigger events associated with the first slide of the PPT® file for displaying the digital content 208A associated with the first slide on at least one user device of the first set of user devices 204A. Further, at a second timestamp, upon the identification of the one or more trigger events associated with the second slide of the PPT® file, the system 202 updates each instruction of the first set of instructions 202B based on the identified one or more trigger events.

At 408A, a first set of instructions output operation is executed. In the first set of instructions output operation, the system 202 is configured to output the first set of instructions 202B. In an embodiment, upon updating the first set of instructions 202B according to the identified one or more trigger events associated with the second slide, the system 202 is configured to output the updated first set of instructions 202B to at least one user device of the first set of user devices 204A for the display of the digital content 208A associated with the second slide of the PPT® file within the virtual environment 206.

At 406B, a second set of instructions update operation is executed. In the second set of instructions update operation, the system 202 is configured to update each instruction of the second set of instructions 202C. For example, at a first timestamp, the second set of instructions 202C are generated according to the one or more trigger events associated with the first slide of the PPT® file for displaying the digital content 208A associated with the first slide on at least one user device of the second set of user devices 204B. Further, at a second timestamp, upon the identification of the one or more trigger events associated with the second slide of the PPT® file, the system 202 updates each instruction of the second set of instructions 202C based on the identified one or more trigger events associated with the second slide. In an embodiment, the first set of instructions update 406A operation and the second set of instructions update 406B operation are performed simultaneously.

At 408B, a second set of instructions output operation is executed. In the second set of instructions output operation, the system 202 is configured to output the second set of instructions 202C. In an embodiment, upon updating the second set of instructions 202C according to the identified one or more trigger events associated with the second slide, the system 202 is configured to output the updated second set of instructions 202C to at least one user device of the second set of user devices 204B for the display of the digital content 208A associated with the second slide of the PPT® file within the virtual environment 206. In an embodiment, the first set of instructions output 408A operation and the second set of instructions output 408B operation are performed simultaneously.

Figure 5:
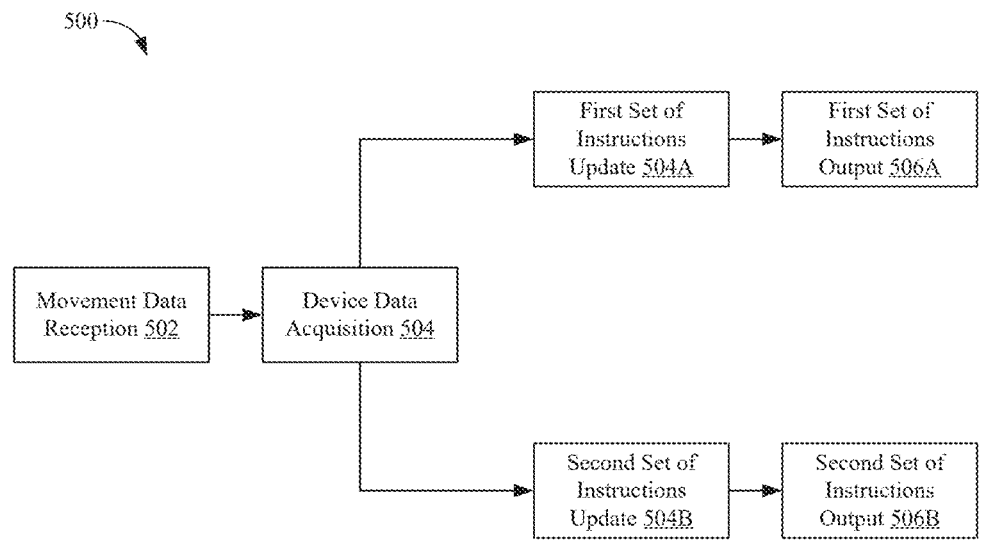
FIG. 5. is a diagram that illustrates one or more operations performed by the system for an update of at least one of the first set of instructions or second set of instructions based on movement data and device data, in accordance with an embodiment of the disclosure.

FIG. 5. is a diagram 500 that illustrates one or more operations performed by the system 202 for an update of at least one of the first set of instructions 202B or second set of instructions 202C based on movement data and device data, in accordance with an embodiment of the disclosure. FIG. 5 is explained in conjunction with elements from FIG. 1, FIG. 2, FIG. 3, and FIG. 4. With reference to FIG. 4, the operations may start at 502.

At 502, a movement data reception operation is executed. In the movement data reception operation, the system 202 is configured to receive movement data associated with a movement of a user associated with a user device. In an embodiment, the user is one of the first user 210A or the second user 210B. Further, the user device is associated with one of the first set of user devices 204A or the second set of user devices 204B.

By way of example and not by limitation, the movement data is associated with the movement of the user (say the first user 210A) associated with the user device (say the user device associated with the first set of user devices 204A). In an exemplary scenario, the first user 210A (that may be a presenter of the presentation (the PPT® file) within the virtual environment 206) moves from a location "A" to a location "B". Both, the location "A" and the location "B" are in a place (such as but not limited to, a room, a classroom, a conference hall, an auditorium) where the first user 210A is presenting the input data 208 (such as the PPT® file). When the first user 210A moves from the location "A" to the location "B", the avatar of the first user 210A also moves from the location "A" to the location "B" within the virtual environment 206 as the virtual environment 206 is a virtual representation of the place where the first user 210A is presenting the PPT® file. It may be noted that the virtual environment 206 being the virtual representation of the place where the first user 210A is presenting the PPT® file is an example and may not be considered as a limitation.

In an exemplary scenario, within the virtual environment 206, the textual information associated with the dolphins is displayed on the virtual screen present within the virtual environment 206. The location "A" where the avatar of the first user 210A is present at a first timestamp is 1 meter away from the virtual screen. Further, based on the movement data, the system 202 identifies that the first user 210A has moved to the location "B" at a second timestamp. As the first user 210A changes the position, the position of the avatar of the first user 210A also changes within the virtual environment 206 from the location "A" to the location "B". In an example, the location "B" is 5 meters away from the virtual screen. Similarly, the system 202 is configured to receive the movement data associated with the user of the user device of the second set of user devices 204B.

At 504, a device data acquisition operation is executed. In the device data acquisition operation, the system 202 is configured to obtain the device data associated with the user device upon the reception of the movement data at 502. The device data indicates a movement of the user device and an operation status of the user device.

In an exemplary scenario, the user device of the first set of user devices 204A may correspond to a Virtual Reality headset. Further, when the first user 210A associated with the user device of the first set of user devices 204A moves from the location "A" to the location "B", the user device also moves with the movement of the first user 210A from the location "A" to the location "B". The system 202 obtains the device data associated with the movement of the user device. Similarly, the system 202 is configured to determine the device data associated with the movement of the user device of the first set of user devices 204A and the user device of the second set of user devices 204B. Further, the system 202 is configured to update at least one of the first set of instructions 202B or the second set of instructions 202C based on the movement data and the device data.

At 504A, a first set of instructions update operation is executed. In the first set of instructions update operation, the system 202 is configured to update the first set of instructions 202B based on the received movement data and the obtained device data.

By way of an example and not limitation, the received movement data indicates that the first user 210A moved from the location "A" to the location "B". Further, the obtained device data of the user device associated with the first user 210A indicates that user device moved from the location "A" to the location "B". In this scenario, the system 202 updates the first set of instructions 202B based on the movement data and the device data. At the first timestamp, the textual information associated with the dolphins that is displayed on the virtual screen within the virtual environment 206 appears to be in smaller size due to the avatar of the first user 210A being closer to the virtual screen (for example, at the location A). Further, when the first user 210A moves to the location "B" at the second timestamp, the system 202 determines that the avatar of the first user 210A has moved away from the virtual screen. As the avatar of the first user 210A is away from the virtual screen at the second timestamp, the system 202 updates the first set of instructions 202B for the display of the digital content 208A (say the textual information associated with the dolphin) within the virtual environment 206. The updated first set of instructions 202B may cause the textual information associated with the dolphins to be displayed in a bigger size due to the avatar of the first user 210A being away from the virtual screen. Updating the first set of instructions 202B based on the movement data of the first user 210A and the device data of the user device associated with the first user 210A ensures the digital content 208A remains clear and visible to the first user 210A irrespective of the movement of the first user 210A.

At 506A, a first set of instructions output operation is executed. In the first set of instructions output operation, the system 202 is configured to output the updated first set of instructions 202B to the at least one user device of the first set of user devices 204A for the display of the digital content 208A within the virtual environment 206.

At 504B, a second set of instructions update operation is executed. In the second set of instructions update operation, the system 202 is configured to update the second set of instructions 202C based on the received movement data and the obtained device data. In an embodiment, the system 202 updates the second set of instructions 202C similar to the update of the first set of instructions 202B described at 504A. For the sake of brevity, the process of updating the second set of instructions is not explained in detail.

At 506B, a second set of instructions output operation is executed. In THE second set of instructions output operation, the system 202 is configured to output the updated second set of instructions 202C to the at least one user device of the second set of user devices 204B for the display of the digital content 208A within the virtual environment 206.

Figure 6:
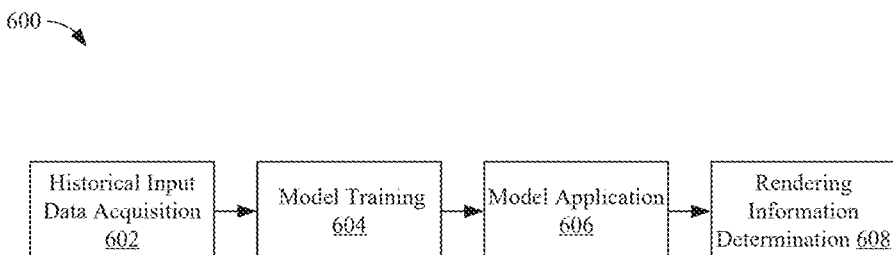
FIG. 6 is a diagram that illustrates a block diagram for training of Artificial Intelligence (AI) model for determination of rendering information, in accordance with an embodiment of the disclosure.

FIG. 6 is a diagram 600 that illustrates a block diagram for the training of AI model 202A for the determination of rendering information, in accordance with an embodiment of the disclosure. FIG. 6 is explained in conjunction with elements from FIG. 1, FIG. 2, FIG. 3, FIG. 4, and FIG. 5. With reference to FIG. 4, the operations may start at 602.

At 602, a historical input data acquisition operation is executed. In the historical input data acquisition operation, the system 202 is configured to obtain historical input data. In an embodiment, the system 202 obtains the historical input data from one or more sources. The historical input data includes a plurality of display instructions for the display of historical digital content and historical configuration data for the display of the historical digital content.

In this embodiment, the system 202 implements the historical input data acquisition operation to enhance virtual reality presentations. The system gathers historical input data from various sources, including prior presentation sessions, user interactions, and content management systems. The historical input data includes a set of display instructions that state how historical digital content should be visualized in the virtual environment 206. For instance, the plurality of display instructions may outline the layout of slides, the types of multimedia elements to display (such as images, videos, or 3D models), and the sequence in which content is presented in a historical time period. By leveraging this historical input data, the system 202 provides valuable insights into effective presentation strategies in a current day of operation.

Further, the historical input data may include historical configuration data that may be indicative of configuration parameters that reflect the settings used in past presentations in the historical time period, such as user preferences for display styles and interactive elements. This enables the system 202 to suggest optimized configurations adapted to the audience (such as the second user 210B).

At 604, a model training operation is executed. In the model training operation, the system 202 is configured to train the AI model 202A based on the received historical input data.

In an embodiment, the AI model 202A is trained on the historical input data to optimize its performance in processing and analyzing presentation content (such as the configuration data 208B associated with the digital content 208A). This historical input data consists of previous presentations, including the digital content 208A and associated configuration data 208B, which features comments, notes, and annotations made by the first user 210A (presenter) in the historical time period. By utilizing the historical input data, the AI model 202A learns to identify patterns and relationships that inform how various types of the digital content 208A should be displayed within the virtual environment 206. This training process enables the AI model 202A to capture the presenter's (such as the first user 210A) intent and preferences, enhancing its ability to provide designed recommendations for future presentations.

Further, as the AI model 202A processes the historical input data, the AI model 202A employs processes such as semantic parsing and contextual analysis to interpret the comments and directives effectively. For example, if historical input data shows that certain comments lead to specific display strategies such as emphasizing key points or integrating interactive elements the AI model 202A can adapt its recommendations accordingly. This dynamic adaptability ensures that the AI model 202A can transform the insights collected from historical input data into structured outputs suitable for various applications, including virtual displays and 3D rendering. By continuously learning from past presentations, the AI model 202A enhances the overall interactivity and effectiveness of the presentation experience, making it more engaging and responsive to the needs of both presenters (the first user 210A) and participants (the second user 210B).

At 606, a model application operation is executed. In the model application operation, the system 202 is configured to apply the trained AI model 202A on the configuration data 208B associated with the digital content 208A.

In an exemplary scenario, once the system 202 receives the input data 208 (the PPT® file), the system 202 applies the trained AI model 202A on the configuration data 208B within the PPT® file. For example, the configuration data 208B associated with the first slide of the PPT® file includes a first comment and a second comment. The first comment and the second comment are associated with the display of the digital content 208A present within the first slide of the PPT® file. In an embodiment, the first comment and the first comment are defined by the first user 210A.

Further, the first comment associated with the textual information of the coral reef present on the first slide of the PPT® file is labeled as "Use a vibrant color for the text to match the coral reef imagery and draw attention to the main points.". Further, the second comment associated with the one or more images of the coral reef present on the first slide of the PPT® file is labeled as "Add a gentle fade-in animation for the images of the coral reef to create a smooth transition as I introduce the topic." The first comment and the second comment indicate that the first user 210A (presenter) wants to engage with the second user 210B more effectively by gradually revealing the one or more images, creating an inviting and immersive introduction to the subject of the coral reefs. Further, the system 202 applies the AI model 202A on the configuration data 208B (the first comment and the second comment). Similarly, the system

202 applies the AI model 202A on the configuration data 208B associated with each slide of the PPT® file.

At 608, a rendering information determination operation is executed. In the rendering information determination operation, the system 202 is configured to determine the rendering information based on the application of the trained AI model 202A.

In an exemplary scenario, based on the first comment labeled as "Use a vibrant color for the text to match the coral reef imagery", the system 202 determines the rendering characteristics that specify the text color, font size, and formatting style associated with the display of the textual information of the coral reef. The AI model 202A identifies the appropriate vibrant color palette derived from the coral reef images, ensuring that the text is visually appealing and consistent with the one or more images present in the first slide of the PPT® file.

Similarly, based on the second comment labeled as "Add a gentle fade-in animation for the images of the coral reef", the system 202 establishes the rendering characteristics related to animation timing and effects. The application of the AI model 202A specifies that the one or more images should gradually appear with a fade-in effect, enhancing the presentation's flow as the first user 210A introduces the topic. The rendering information is then adapted for optimal display on both the first set of user devices 204A and the second set of user devices 204B, ensuring a synchronized and immersive experience for all participants in the virtual environment 206. Further, the system 202 is configured to control each user device of the first set of user devices and each user device of the second set of user devices to display the digital content 208A. The digital content 208A is displayed based on the determined rendering information.

Figure 7:
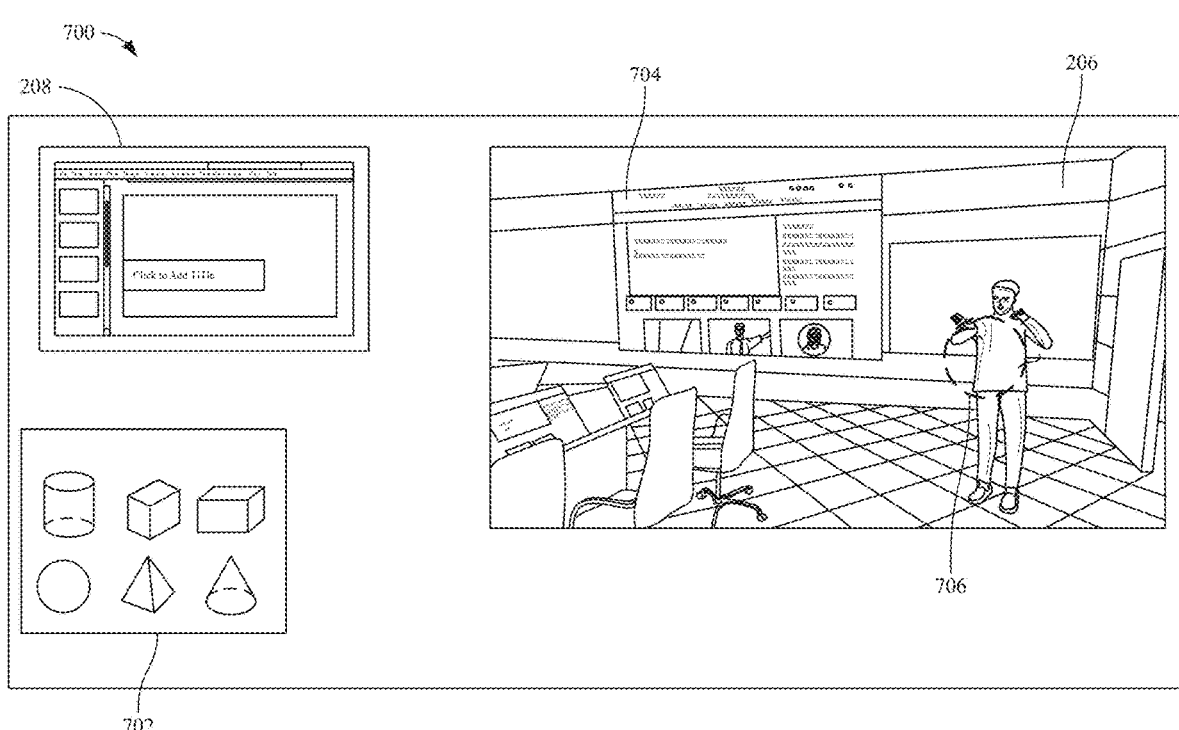
FIG. 7 is a diagram that illustrates a use case scenario for the delivery of the digital content in the virtual reality session, in accordance with an embodiment of the disclosure.

FIG. 7 is a diagram 700 that illustrates a use case scenario for the delivery of the digital content 208A in a virtual reality session, in accordance with an embodiment of the disclosure. With reference to FIG. 7, the diagram 700 includes a virtual environment 206, input data 208, one or more 3D shapes 702, a virtual screen 704, and a circular object 706. FIG. 7 is explained in conjunction with elements from FIG. 1, FIG. 2, FIG. 3, FIG. 4, FIG. 5, and FIG. 6.

In an embodiment, the process begins with the first user 210A creating a presentation file (the input data 208) such as the PPT® file. This file incorporates a diverse array of digital content 208A, including text, images, videos, and interactive 3D models. The first user 210A organizes the digital content to support the overall narrative, ensuring coherence across slides. For instance, images of coral reefs may be paired with relevant statistics and videos of marine ecosystems to provide a multi-dimensional understanding of the topic. After finalizing the design and layout, the first user 210A saves the file in a compatible format, such as (PowerPoint Open Extensible Markup Language (XML)) PPTX, which can be seamlessly read and processed by the system 202. This ensures that the system 202 can extract and interpret the digital content 208A, including any annotations or comments made by the first user 210A.

As shown in FIG. 7, 206 is the virtual environment. Further, 208 corresponds to the input data (the first slide of the PPT® file that is to be displayed within the virtual environment 206). In an embodiment, the first slide of the PPT® file may include one or more 3D shapes labeled as 702. Further, the first user 210A may have defined the configuration data 208B associated with digital content 208A within the first slide of PPT® file.

As shown in FIG. 7, a circular object 706 from the one or more 3D shapes 702 can be seen displayed in front of the avatar of the first user 210A within the virtual environment 206 and the textual information is displayed on a virtual screen 704 within the virtual environment 206. In an embodiment, the system 202 is configured to determine interaction data associated with an interaction between the display of the digital content 208A within the virtual environment 206 and at least one user of the first user 210A or the second user 210B.

In an exemplary scenario, the first user 210A interacts with the circular object 706 displayed within the virtual environment 206. Further, during the interaction, the first user 210A modifies the structure of the circular object 706. The interaction data may be indicative of this modification made by the first user 210A. Further, based on the interaction data, the system 202 is configured to update at least one of the first set of instructions 202B or the second set of instructions 202C. In an alternate exemplary scenario, the system 202 is further configured to allow the first user 210A and the second user 210B to interact with the circular object 706 simultaneously. The first user 210A utilizes the user device of the first set of user devices 204A to interact with the circular object 706 and the second user 210B utilizes the user device of the second set of user devices 204B to interact with the circular object 706. For example, the first user 210A and the second user 210B may collaborate to adjust the position and size of the circular object which may be for example, a 3D model of a marine ecosystem. In an exemplary scenario, the system 202 updates the first set of instructions 202B and the second set of instructions 202C based on the modifications and saves the collaborative adjustments made to the 3D model of the marine ecosystem, preserving the modified state for future VR presentations or educational purposes. In an embodiment, during the future VR presentation (future interaction session) the system 202 is configured to output the at least one of the updated first set of instructions 202B or the updated second set of instructions 202C.

In an embodiment, the system 202 integrates real-time feedback and assessment mechanisms designed to enhance participant engagement and comprehension within the virtual environment 206. During the presentation, the system 202 can monitor the interaction and understanding of the second user 210B through various interactive tools, such as quizzes, polls, and assessment activities. For example, at a strategic point during the interaction session, the first user 210A may decide to pause and launch a quiz that assesses the participants' grasp of the material covered during the interaction session.

Further, as the second user 210B engages with the quizzes, the polls, and the interactive assessments, the system 202 captures detailed analytics on their responses, time spent on various content segments, and overall engagement levels. For example, after the interaction session concludes, the first user 210A can review a comprehensive analytics report that highlights performance of the second user 210B on the quizzes, and areas of interest based on time spent with specific content, and engagement metrics. This data-driven insight allows the first user 210A to evaluate the effectiveness of the interaction session, identify topics that resonated well with the audience (such as the second user 210B), and pinpoint areas needing further clarification.

FIG. 8 illustrates a flowchart 800 of a first exemplary method for the delivery of the digital content 208A in a virtual reality session, in accordance with an embodiment of the disclosure. FIG. 8 is explained in conjunction with elements of FIG. 1, FIG. 2, FIG. 3, FIG. 4, FIG. 5, FIG. 6, and FIG. 7. With reference to FIG. 8, there is shown a flowchart 800. The operations of the exemplary method may be executed by any computing system, for example, by the computer 102 of FIG. 1 or the system 202 of FIG. 2. The operations of the flowchart 800 may start at 802.

At 802, the input data 208 including the digital content 208A and the configuration data 208B. The configuration data 208B is associated with the digital content 208A is received. In an embodiment, the system 202 is configured to receive the input data 208 including the digital content 208A and the configuration data 208B associated with the digital content 208A.

In an embodiment, the configuration data 208B includes the one or more display attributes associated with the display of the digital content 208A on each user device of the first set of user devices 204A and each user device of the second set of user devices 204B. The digital content 208A is displayed within the virtual environment 206. Further, the digital content 208A corresponds to at least one of the image, the video, the three-dimensional (3D) object, the audio, or the text.

At 804, the rendering information associated with the digital content 208A is determined based on the configuration data 208B. The rendering information includes the one or more rendering characteristics for the display of the digital content 208A within the virtual environment 206. In an embodiment, the system 202 is configured to determine the rendering information associated with the digital content 208A based on the configuration data 208B. The rendering information includes the one or more rendering characteristics for the display of the digital content 208A within the virtual environment 206. The virtual environment 206 is displayed on the first set of user devices 204A and the second set of user devices 204B.

In an embodiment, each rendering characteristic of the one or more rendering characteristics corresponds to one of the size information associated with the digital content 208A, color information associated with the digital content 208A, texture information associated with the digital content 208A, or resolution information associated with the digital content 208A.

At 806, the first set of instructions 202B is generated for each user device of the first set of user devices 204A based on the rendering information. The first set of instructions 202B is associated with the display of the digital content 208A within the virtual environment 206 on at least one user device of the first set of user devices 204A. In an embodiment, the system 202 is configured to generate the first set of instructions 202B for each user device of the first set of user devices based on the rendering information. The first set of instructions 202B is associated with the display of the digital content 208A within the virtual environment 206 on at least one user device of the first set of user devices 204A.

At 808, the second set of instructions 202C is generated for each user device of the second set of user devices 204B based on the rendering information. The second set of instructions 202C is associated with the display of the digital content 208A within the virtual environment 206 on at least one user device of the second set of user devices 204B. In an embodiment, the system 202 is configured to generate the second set of instructions 202B for each user device of the second set of user devices 204B based on the rendering information. The second set of instructions 202C is associated with the display of the digital content 208A within the virtual environment 206 on at least one user device of the second set of user devices 204B.

At 810, each instruction of the first set of instructions 202B and each instruction of the second set of instructions 202C is outputted for the display of the digital content 208A within the virtual environment 206. The digital content 208A is displayed on each user device of the first set of user devices 204A and each user device of the second set of user devices 204B. In an embodiment, the system 202 is configured to output each instruction of the first set of instructions 202B and each instruction of the second set of instructions 202C for the display of the digital content 208A within the virtual environment 206. The digital content 208A is displayed on each user device of the first set of user devices 204A and each user device of the second set of user devices 204B.

FIG. 9 illustrates a flowchart 900 of a second exemplary method for the delivery of the digital content 208A in a virtual reality session, in accordance with an embodiment of the disclosure. FIG. 9 is explained in conjunction with elements of FIG. 1, FIG. 2, FIG. 3, FIG. 4, FIG. 5, FIG. 6, FIG. 7, and FIG. 8. With reference to FIG. 9, there is shown a flowchart 900. The operations of the exemplary method may be executed by any computing system, for example, by the computer 102 of FIG. 1 or the system 202 of FIG. 2. The operations of the flowchart 900 may start at 902.

At 902, the input data 208 including the digital content 208A and the configuration data 208B is received. The configuration data 208B is associated with the digital content 208A is received. In an embodiment, the system 202 is configured to receive the input data 208 including the digital content 208A and the configuration data 208B associated with the digital content 208A.

At 904, the rendering information associated with the digital content 208A is determined based on the configuration data 208B. The rendering information includes the one or more rendering characteristics for the display of the digital content 208A within the virtual environment 206. In an embodiment, the system 202 is configured to determine the rendering information associated with the digital content 208A based on the configuration data 208B. The rendering information includes the one or more rendering characteristics for the display of the digital content 208A within the virtual environment 206. The virtual environment 206 is displayed on the first set of user devices 204A and the second set of user devices 204B.

At 906, the first set of instructions 202B are generated for each user device of the first set of user devices 204A based on the rendering information and the one or more first device parameters. In an embodiment, the system 202 is configured to generate the first set of instructions 202B based on the rendering information and the one or more first device parameters.

At 908, the second set of instructions 202C are generated for each user device of the second set of user devices 204B based on the rendering information and the one or more second device parameters. In an embodiment, the system 202 is configured to generate the second set of instructions 202C based on the rendering information and the one or more second device parameters.

At 910, each of the first set of instructions 202B and each of the second set of instructions 202C are outputted on each user device of the first set of user devices 204A and each user device of the second set of user devices 204B, respectively. In an embodiment, the system 202 is configured to output each of the first set of instructions 202B and each of the second set of instructions 202C on each user device of the first set of user devices 204A and each user device of the second set of user devices 204B, respectively.

According to one or more embodiments of the disclosure, a computer program product delivery of the digital content in the virtual reality session is disclosed. The computer program product includes one or more computer-readable storage media and program instructions stored on the one or more computer-readable storage media to perform operations. The operations include receiving input data including digital content and configuration data. The configuration data is associated with the digital content. The operations further include determining rendering information associated with the digital content based on the configuration data. The rendering information includes one or more rendering characteristics for a display of the digital content within a virtual environment. The virtual environment is displayed on a first set of user devices and a second set of user devices. The operations further include generating a first set of instructions for each user device of the first set of user devices based on the rendering information. The first set of instructions is associated with the display of the digital content within the virtual environment on at least one user device of the first set of user devices. The operations further include generating a second set of instructions for each user device of the second set of user devices based on the rendering information. The second set of instructions is associated with the display of the digital content within the virtual environment on at least one user device of the second set of user devices. The operations further include outputting each instruction of the first set of instructions and the second set of instructions for the display of the digital content within the virtual environment. The digital content is displayed on each user device of the first set of user devices and each user device of the second set of user devices.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computer, input data comprising digital content and configuration data, wherein the configuration data is associated with the digital content;
determining, by the computer, rendering information associated with the digital content based on the configuration data, wherein
the rendering information comprises one or more rendering characteristics for display of the digital content within a virtual environment, and
the virtual environment is displayed on a first set of user devices and a second set of user devices;
generating, by the computer, a first set of instructions for each user device of the first set of user devices based on the rendering information, wherein the first set of instructions is associated with the display of the digital content within the virtual environment on at least one user device of the first set of user devices;
generating, by the computer, a second set of instructions for each user device of the second set of user devices based on the rendering information, wherein the second set of instructions is associated with the display of the digital content within the virtual environment on at least one user device of the second set of user devices; and outputting, by the computer, each instruction of the first set of instructions and each instruction of the second set of instructions for the display of the digital content within the virtual environment, wherein the digital content is displayed on each user device of the first set of user devices and each user device of the second set of user devices.

2. The computer-implemented method of claim 1, further comprising:

obtaining, by the computer, one or more first device parameters associated with each user device of the first set of user devices;

generating, by the computer, the first set of instructions for each user device of the first set of user devices based on the one or more first device parameters; and outputting, by the computer, the first set of instructions in association with the input data on each user device of the first set of user devices.

3. The computer-implemented method of claim 1, further comprising:

obtaining, by the computer, one or more second device parameters associated with each user device of the second set of user devices;

generating, by the computer, the second set of instructions for each user device of the second set of user devices based on the one or more second device parameters; and outputting, by the computer, the second set of instructions in association with the input data on each user device of the second set of user devices.

4. The computer-implemented method of claim 1, wherein the configuration data comprises one or more display attributes associated with the display of the digital content on each user device of the first set of user devices and each user device of the second set of user devices.

5. The computer-implemented method of claim 1, further comprising controlling, by the computer, each user device of the first set of user devices and each user device of the second set of user devices to display the digital content.

6. The computer-implemented method of claim 1, wherein each user device of the first set of user devices is associated with at least a first user, and wherein each user device of the second set of user devices is associated with at least a second user.

7. The computer-implemented method of claim 6, further comprising receiving, by the computer, the input data from the at least one user device of the first set of user devices.

8. The computer-implemented method of claim 6, further comprising:

determining, by the computer, trigger data associated with one or more trigger events based on the configuration data;

obtaining, by the computer, session data associated with an interaction session, wherein the interaction session corresponds to an interaction between the virtual environment and at least one user of the first user or the second user;

identifying, by the computer, at least one trigger event of the one or more trigger events based on the session data and the trigger data;

updating, by the computer, each instruction of the first set of instructions and each instruction of the second set of instructions based on the at least one trigger event; and

outputting, by the computer, each instruction of the updated first set of instructions and each instruction of the updated second set of instructions.

9. The computer-implemented method of claim 6, further comprising:

receiving, by the computer, gesture information associated with the first user of the at least one user device of the first set of user devices, wherein the gesture information is received from at least one of one or more tracking devices associated with the first user, the first set of user devices, or the second set of user devices;

updating, by the computer, each instruction of the first set of instructions and each instruction of the second set of instructions based on the gesture information; and outputting, by the computer, at least one of the updated first set of instructions or the updated second set of instructions.

10. The computer-implemented method of claim 9, further comprising:

receiving, by the computer, movement data associated with a movement of a user associated with a user device, wherein the user is one of the first user or the second user, and wherein the user device is associated with one of the first set of user devices or the second set of user devices;

obtaining, by the computer, device data associated with the user device, wherein the device data indicates a movement of the user device and an operational status of the user device;

updating, by the computer, at least one of the first set of instructions or the second set of instructions based on the movement data and the device data; and outputting, by the computer, the at least one of the updated first set of instructions or the updated second set of instructions.

11. The computer-implemented method of claim 9, further comprising:

determining, by the computer, interaction data associated with an interaction between the display of the digital content within the virtual environment and at least one user of the first user or the second user;

updating, by the computer, at least one of the first set of instructions or the second set of instructions based on the interaction data; and outputting, by the computer, the at least one of the updated first set of instructions or the updated second set of instructions.

12. The computer-implemented method of claim 1, further comprising:

obtaining, by the computer, historical input data that comprises:

a plurality of display instructions for display of historical digital content, and historical configuration data for the display of the historical digital content;

training, by the computer, an artificial intelligence (AI) model based on the historical input data;

applying, by the computer, the trained AI model on the configuration data associated with the digital content;

determining, by the computer, the rendering information based on the application of the trained AI model; and controlling, by the computer, each user device of the first set of user devices and each user device of the second set of user devices to display the digital content, wherein the digital content is displayed based on the rendering information.

13. The computer-implemented method of claim 1, further comprising:

receiving, by the computer, request data from at least one user device of the first set of user devices or the second set of user devices, wherein the request data is associated with a generation of the virtual environment; and generating, by the computer, the virtual environment based on the request data.

14. The computer-implemented method of claim 1, wherein the digital content corresponds to at least one of an image, a video, a three-dimensional (3D) object, an audio, or a text.

15. The computer-implemented method of claim 1, wherein each rendering characteristic of the one or more rendering characteristics corresponds to one of size information associated with the digital content, color information associated with the digital content, texture information associated with the digital content, or resolution information associated with the digital content.

16. A computer system, comprising:

a processor set;

one or more computer-readable storage media; and program instructions stored on the one or more computer-readable storage media, the program instructions executable by the processor set to cause the processor set to:

receive input data comprising digital content and configuration data, wherein the configuration data is associated with the digital content;

determine rendering information associated with the digital content based on the configuration data, wherein the rendering information comprises one or more rendering characteristics for a display of the digital content within a virtual environment, and the virtual environment is displayed on a first set of user devices and a second set of user devices;

generate a first set of instructions for each user device of the first set of user devices based on the rendering information and one or more first device parameters;

generate a second set of instructions for each user device of the second set of user devices based on the rendering information and one or more second device parameters; and output each of the first set of instructions and each of the second set of instructions on each user device of the first set of user devices and each user device of the second set of user devices, respectively.

17. The computer system of claim 16, wherein each user device of the first set of user devices is associated with at least a first user, and wherein each user device of the second set of user devices is associated with at least a second user.

18. The computer system of claim 17, wherein the program instructions further cause the processor set to receive the input data from at least one user device of the first set of user devices.

19. The computer system of claim 17, wherein the program instructions further cause the processor set to:

determine trigger data associated with one or more trigger events based on the configuration data;

obtain session data associated with an interaction session, wherein the interaction session corresponds to an interaction between the virtual environment and at least one user of the first user or the second user;

identify at least one trigger event of the one or more trigger events based on the session data and the trigger data;

update each instruction of the first set of instructions and each instruction of the second set of instructions based on the at least one trigger event; and output each instruction of the updated first set of instructions and each instruction the updated second set of instructions.

20. A computer program product for delivery of digital content, the computer program product comprising:

one or more computer-readable storage media; and program instructions stored on the one or more computer-readable storage media to perform operations comprising:

receiving input data comprising digital content and configuration data, wherein the configuration data is associated with the digital content;

determining rendering information associated with the digital content based on the configuration data, wherein the rendering information comprises one or more rendering characteristics for a display of the digital content within a virtual environment, and the virtual environment is displayed on a first set of user devices and a second set of user devices;

generating a first set of instructions for each user device of the first set of user devices based on the rendering information, wherein the first set of instructions is associated with the display of the digital content within the virtual environment on at least one user device of the first set of user devices;

generating a second set of instructions for each user device of the second set of user devices based on the rendering information, wherein the second set of instructions is associated with the display of the digital content within the virtual environment on at least one user device of the second set of user devices; and outputting each instruction of the first set of instructions and the second set of instructions for the display of the digital content within the virtual environment, wherein the digital content is displayed on each user device of the first set of user devices and each user device of the second set of user devices.

* * * * *